United States Patent
Evans et al.

(10) Patent No.: US 7,426,509 B2
(45) Date of Patent: Sep. 16, 2008

(54) METHOD AND APPARATUS FOR DOCUMENT FILTERING USING ENSEMBLE FILTERS

(75) Inventors: David A. Evans, Pittsburgh, PA (US); James G. Shanahan, Pittsburgh, PA (US); Victor M. Sheftel, Bethel Park, PA (US); Jeffrey Bennett, Pittsburgh, PA (US); Jesse Montgomery, Coraopolis, PA (US)

(73) Assignee: JustSystems Evans Research, Inc., Pittsburgh, PA (US)

( * ) Notice: Subject to any disclaimer, the term of this patent is extended or adjusted under 35 U.S.C. 154(b) by 424 days.

(21) Appl. No.: 10/713,645

(22) Filed: Nov. 14, 2003

(65) Prior Publication Data

US 2004/0158569 A1    Aug. 12, 2004

Related U.S. Application Data

(60) Provisional application No. 60/426,826, filed on Nov. 15, 2002.

(51) Int. Cl.
*G06F 17/30* (2006.01)
(52) U.S. Cl. .......................................... 707/6
(58) Field of Classification Search ............... 707/1, 707/2, 9, 10, 200, 3, 6; 709/207
See application file for complete search history.

(56) References Cited

U.S. PATENT DOCUMENTS

| | | | |
|---|---|---|---|
| 5,867,799 A * | 2/1999 | Lang et al. | 707/1 |
| 5,907,840 A | 5/1999 | Evans | |
| 5,999,925 A | 12/1999 | Evans | |
| 6,115,706 A * | 9/2000 | Evans | 707/5 |
| 6,205,443 B1 | 3/2001 | Evans | |
| 6,377,947 B1 | 4/2002 | Evans | |
| 6,430,559 B1 | 8/2002 | Zhai | |
| 6,463,434 B2 | 10/2002 | Zhai | |
| 2002/0078035 A1 | 6/2002 | Frank et al. | |
| 2003/0130993 A1 | 7/2003 | Mendelevitch et al. | |
| 2004/0039786 A1 * | 2/2004 | Horvitz et al. | 709/207 |
| 2004/0172378 A1 | 9/2004 | Shanahan et al. | |
| 2006/0089924 A1 | 4/2006 | Raskutti et al. | |

* cited by examiner

*Primary Examiner*—Etienne Leroux
(74) *Attorney, Agent, or Firm*—Jones Day; Blaney Harper

(57) ABSTRACT

A technique for representing an information need and employing one or more filters to select documents that satisfy the represented information need, including a technique of creating filters that involves (a) dividing a set of documents into one or more subsets such that each subset can be used as the source of features for creating a filtering profile or used to set or validate the score threshold for the profile and (b) determining whether multiple profiles are required and how to combine them to create an effective filter. Multiple profiles can be incorporated into an individual filter and the individual filters combined to create an ensemble filter. Ensemble filters can then be further combined to create meta filters.

29 Claims, 21 Drawing Sheets

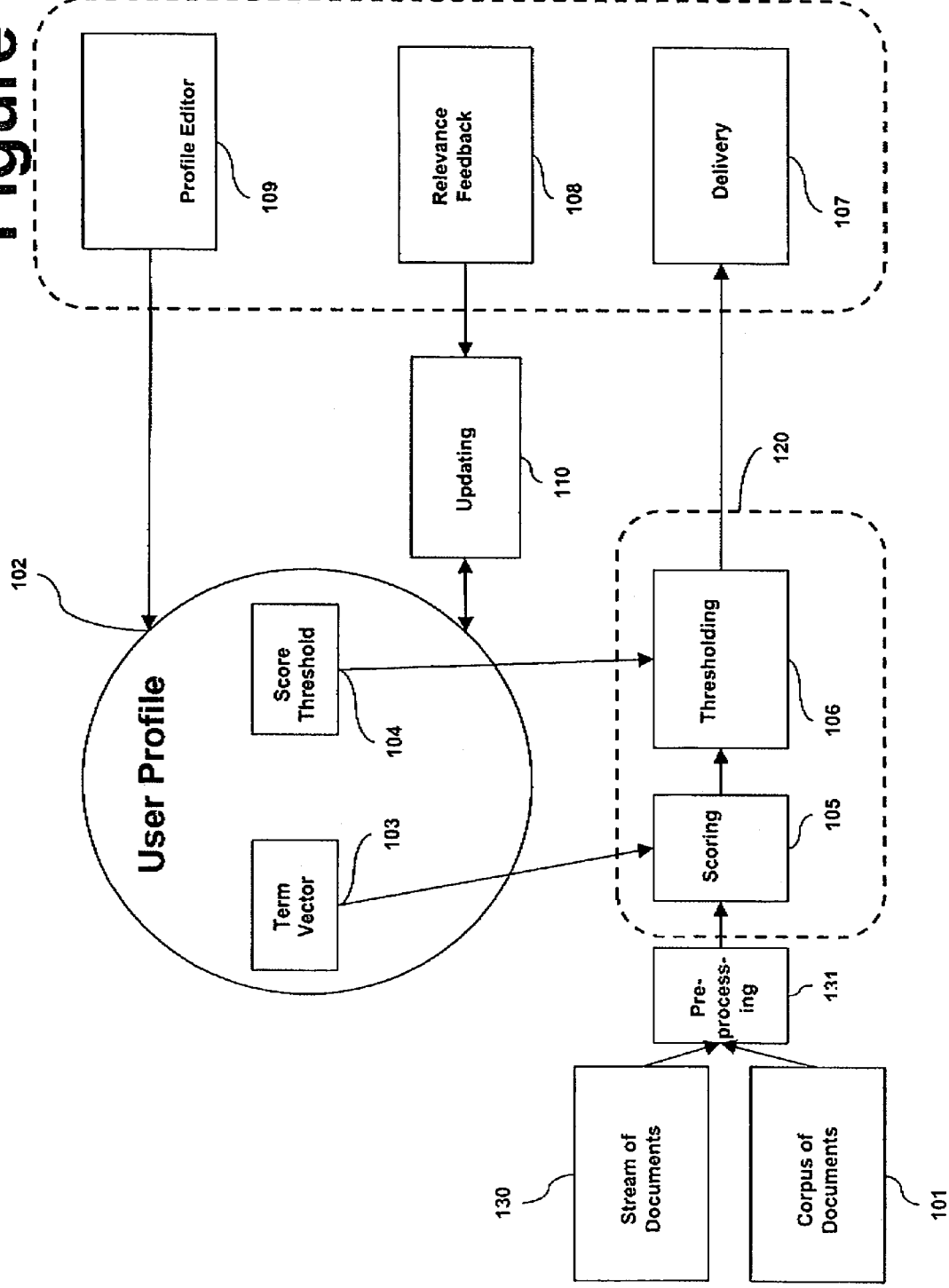

Figure 2(b)

| Doc | Score | | |
|---|---|---|---|
| Doc1 | 99.7 | R | U = 3x1-2x0 = 3 |
| Doc2 | 97.6 | R | U = 3x2-2x0 = 6 |
| Doc3 | 90.1 | N | U = 3x2-2x1 = 4 |
| Doc4 | 88.7 | R | U = 3x3-2x1 = 7 |
| Doc5 | 83.1 | N | U = 3x3-2x2 = 5 |
| Doc6 | 81.1 | N | U = 3x3-2x3 = 3 |
| Doc7 | 76.2 | N | U = 3x3-2x4 = 1 |
| Doc8 | 64.5 | N | U = 3x3-2x5 = -1 |
| Doc9 | 55.9 | N | U = 3x3-2x6 = -3 |

$\theta_{opt}$ — 291
$\theta_{zero}$ — 292

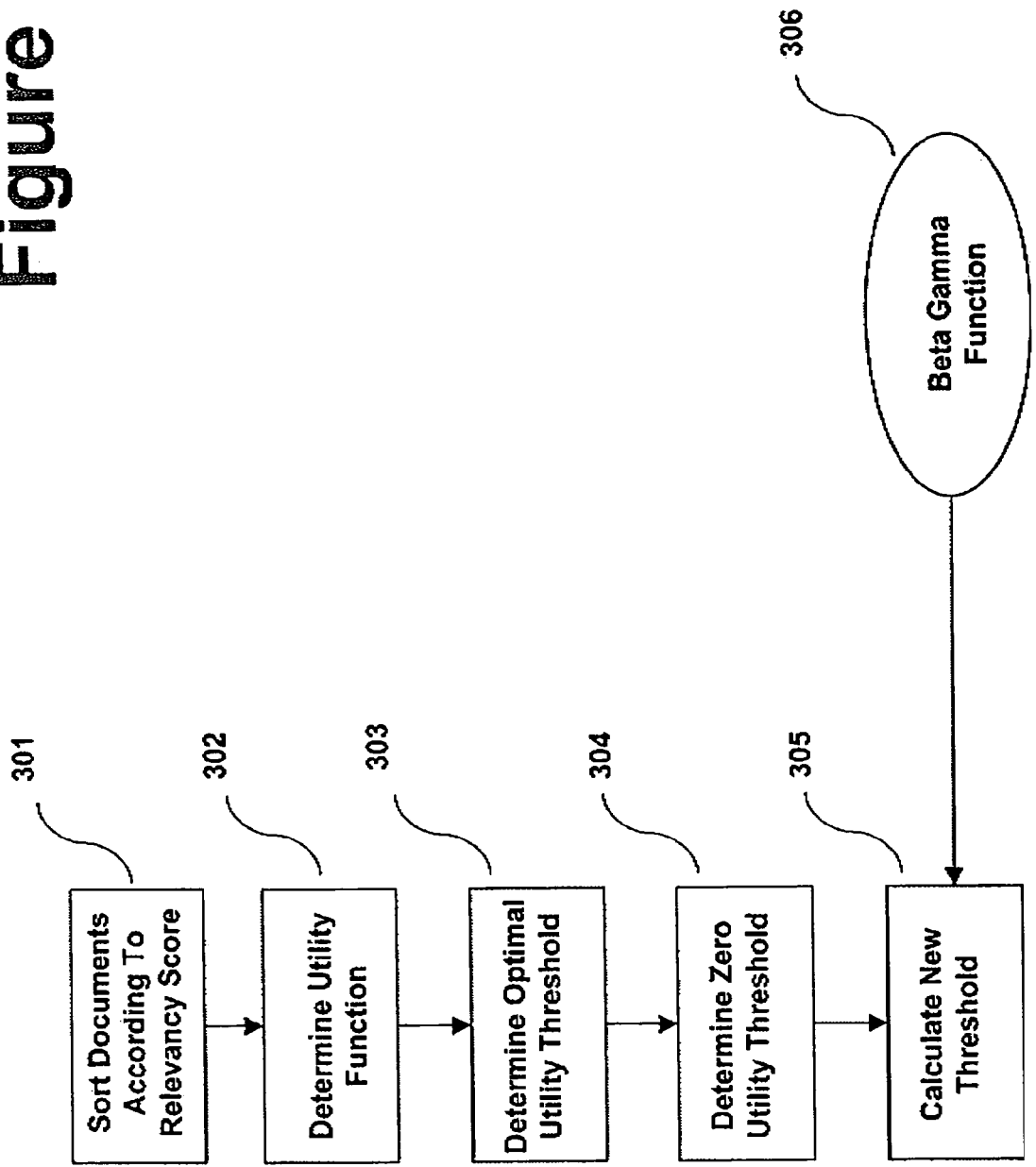

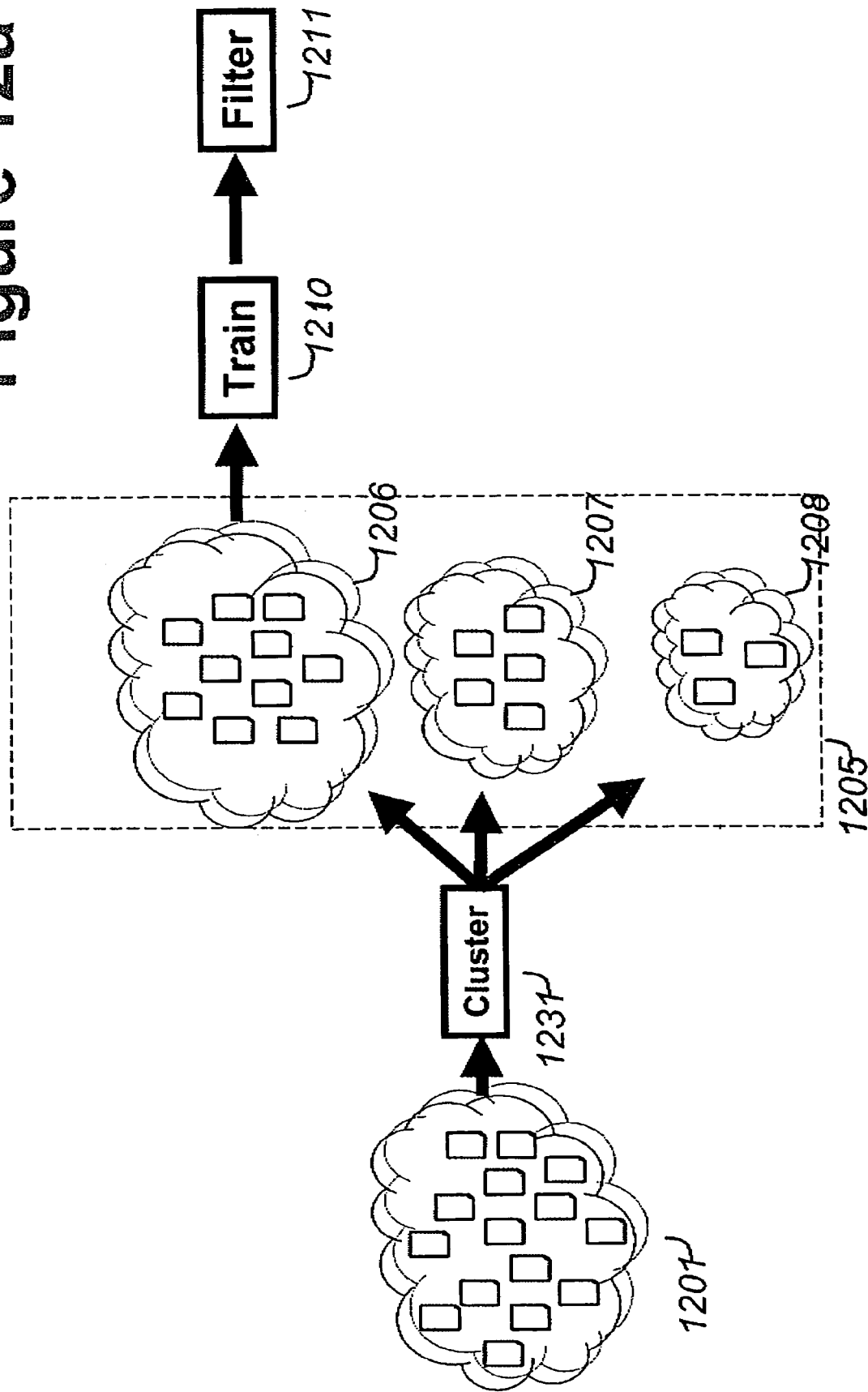

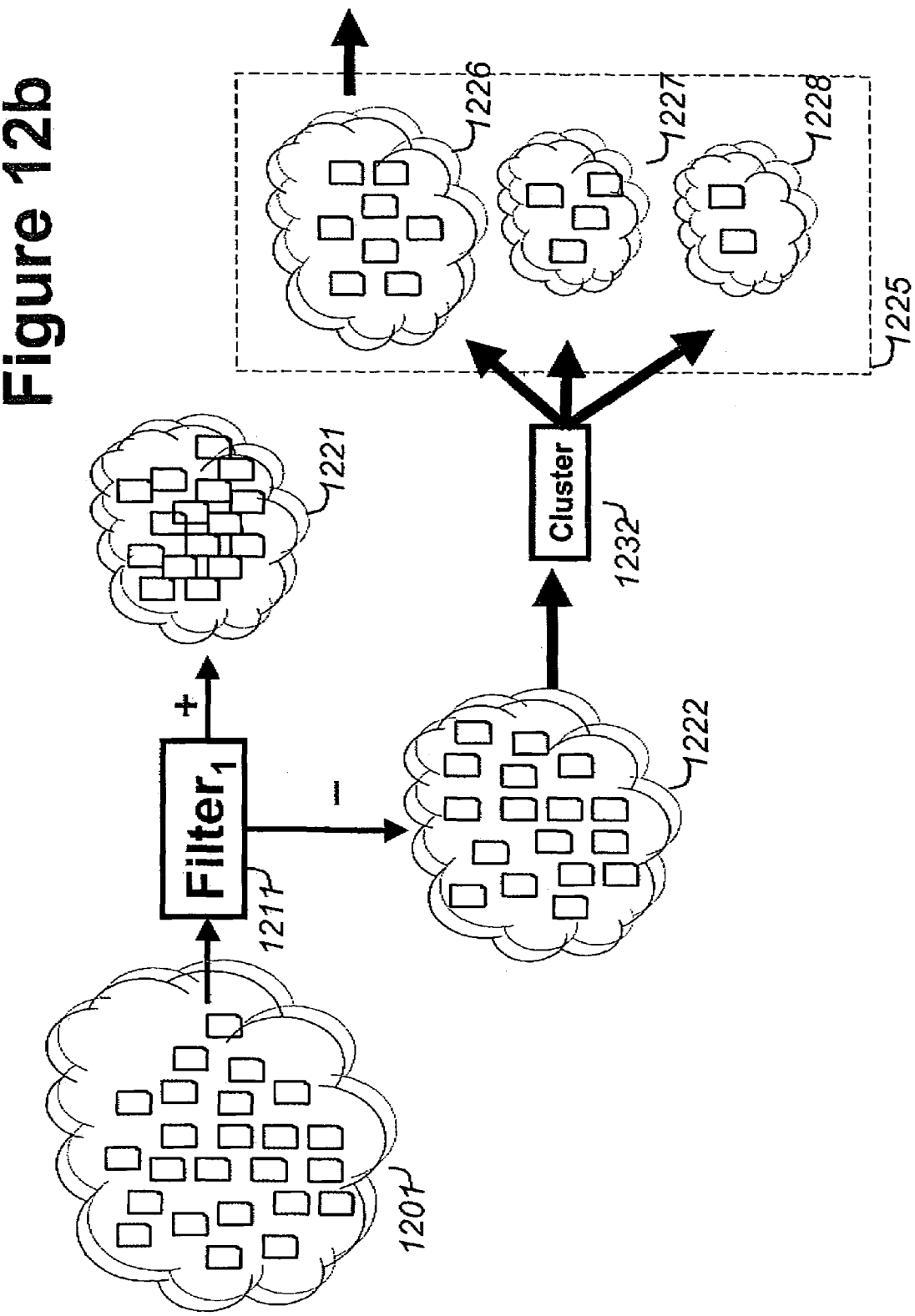

METHOD AND APPARATUS FOR DOCUMENT FILTERING USING ENSEMBLE FILTERS

CROSS-REFERENCE TO RELATED APPLICATION

This application claims priority from and is related to the following prior application: "Method And Apparatus For Document Filtering Using Ensemble Filters," U.S. Provisional Application No. 60/426,826 filed Nov. 15, 2002. This prior application, including the entire written description and drawing figures, is hereby incorporated into the present application by reference.

FIELD OF THE INVENTION

The present invention relates to the field of computerized information search and retrieval systems. More specifically, this invention relates to a method and apparatus for constructing filters to identify documents that satisfy specific user requirements as given in a profile.

BACKGROUND

Given the vast amount of information accessible by computer systems, particularly on distributed databases, more efficient methods of information retrieval are continually needed. One general type of retrieval is exemplified by information filtering. In information filtering, a system retrieves or presents to a user just the limited number of documents (or information) that satisfies a user's requirements. In one form of information filtering, documents are processed in a stream or in batches as they are delivered to the system, perhaps continuously. In contrast to database searching, in which all the documents in the database are available at once and can be evaluated and ranked against one another before being presented to the user, in this form of filtering documents are evaluated by the system one at a time or in small sets and a binary decision to accept or reject a document is made for each individual document. In making such a decision, the system compares the information in a document with the information contained in an information profile, which serves to represent the user's need or topic.

Traditionally, an information profile (used as the basis for a binary document classifier) consists of three key elements: (1) a set of features, often in the form of a term vector, (2) a set of one or more weights or statistics associated with each feature, (3) a scoring threshold. The first two elements are used by the system with a scoring function to assign a score to the document, and the third is used to make the decision whether to accept or reject the document as relevant or not relevant to the user's information need.

The basic approach to profile-based filtering involves a two-step procedure. For each document-profile pair, a relevance score is computed. Conventionally, the computation is based on a weighted combination of the features or terms in the profile as they appear in the document. That score is then compared to the profile score threshold to make the binary decision to accept or reject the document. It is important that the profile score threshold be low enough such that it allows a sufficient number of relevant documents to be returned to the user. However, if the profile score threshold is set too low, a large number of documents will be returned, potentially inundating the user with redundant or irrelevant information. For any information profile, the optimal threshold should represent the best tradeoff between accepting more relevant documents and avoiding accepting non-relevant documents. Such an optimal tradeoff is typically based on the user's stated or assumed utility preference.

In document filtering it is often the case that the user's information need is not expressed directly, as would be the case in a query to an information-retrieval system, but rather is presented to the system as a set of example documents. The set can be regarded as representing a topic or category or class. The system must process the set of documents to derive an information profile. Such a situation presents two problems. First, features must be extracted from the documents and associated with weights. Second, a threshold must be set, based on a scoring function, to establish the basis for accepting or rejecting new documents that are scored against the features in the profile.

Using a set of example documents to find appropriate features and weights and to set a scoring threshold is called the "training" problem. Training typically proceeds in several steps. In the first step, the available example documents are divided into two or more subsets. One of the subsets is processed to find candidate features and weights, forming an initial, partial profile. Another subset is mixed with additional example of documents believed not to be on the example topic. In a second step, this set of mixed documents is passed to the profile created in the first step and each document in the mixed set is given a score. Since the correct (on-topic) documents in the mixed set are known, the performance of the profile can be evaluated.

Successful training of the type outlined above depends on several factors. One important factor is related to the identification of features in the sample documents. It is desirable that the sample documents be highly representative of the topic or category and that the features extracted from the documents be highly likely to occur in all and only the documents on the same topic or in the same category. Difficulties in training arise especially when the example documents do not accurately represent the documents that the system will have to process in the future. This may happen when there are too few examples. This may also happen when the topic or category itself is not well focused.

In general, it is difficult to use example documents for optimal training, to select representative features, to set score thresholds, and to validate the performance of the profile. It is highly desirable to have a principled and automatic method for deciding how best to create a profile and configure a filter based on it.

SUMMARY OF THE INVENTION

The present invention is a technique for representing an information need and employing one or more filters to select documents that satisfy that information need. Creating such filters involves a number of steps, including (a) dividing a set of example documents representing a topic or category into one or more subsets such that each subset can be used as the source of features for creating a filtering profile or used to set or validate the score threshold for the profile and (b) determining whether multiple profiles are required and, if so, how to combine them to create an effective filter. In particular, when multiple profiles are required, this method incorporates each profile into an individual filter and the individual filters are combined to create an ensemble filter. Ensemble filters can then be further combined to create meta filters. When single filters do not adequately model a topic or category, the ensemble and meta filters can produce more accurate and robust results.

The present invention also is a method for the construction of two specific kinds of ensemble filters, multiplex filters and cascade filters. Multiplex filters consist of two or more element filters each of which can score a document as to its membership in a category. Each element filter is trained independently on all or part of the example data. The scores of each element filter in a multiplex filter can be combined or assessed to yield a final score for a document and an associated decision can be made to accept or reject the document. Cascade filters consist of two or more element filters in a sequence. The first element filter scores a document as to its membership in a category and based on the score either accepts or rejects the document. If a document is accepted by the first element filter, it is removed from further consideration by other element filters. If it is rejected, it is passed to the second element filter for consideration. Subsequently, and in general, any element filter after the first one sees only those documents that been rejected by all previous element filters in the sequence. In cascade configurations, element filters are not trained independently. Rather, the specific example documents that are used to train any one element filter in a cascade may be determined by and may be dependent on the classification characteristics of other element filters that have processed the documents before that element filter. In particular, an element filter in a sequence will be trained using documents that have been scored by element filters earlier in the sequence. In one embodiment of this approach, an element filter in a sequence is trained using only remainder documents, i.e. those documents that have been rejected by all element filters earlier in the sequence. In another embodiment, an element filter in a sequence is trained based on features for documents that include features added by all element filters earlier in the sequence.

The present invention also specifies a method for finding the best filter for a set of example documents. In particular, the method specifies (1) creating some combination of (a) a monolithic filter, (b) a multiplex filter, and (c) a cascade filter using the set of example documents and (2) comparing the performance of each filter type. Based on a measure that reflects a user's preferences, such as the preference for high precision or the preference for high recall, one or a combination of the constructed filters is chosen and used to represent the category of the example documents and to filter new documents.

The present invention also specifies a method for selecting subsets of example documents using clustering and then constructing filters based on the document clusters. In some instances of the invention, the filter construction proceeds in such a way that clustering is applied at many points, for example, to the fallout or remainder documents, or to misclassified documents of documents processed by one or more other filters.

BRIEF DESCRIPTION OF THE DRAWINGS

FIG. 1 is a flow chart that illustrates a method according to the present invention for filtering relevant information from a corpus or a stream of documents.

FIG. 2b is an illustration of a ranked list of documents with scores and relevance attributes showing the set utility of the list as calculated at each rank of the list of documents.

FIG. 3 is a flow chart that illustrates a method according to the present invention for setting a threshold of a user profile in an information retrieval/filtering system.

FIG. 12a is an illustration of clustering to create subsets of documents used in filter creation according to one embodiment of the present invention.

FIG. 12b is an illustration of the use of a filter to separate documents into two subsets, the fallout, or remainder subset of which is clustered to create subsets of data used in filter creation according to one embodiment of the present invention.

DESCRIPTION OF THE PREFERRED EMBODIMENT

Figure 2A:
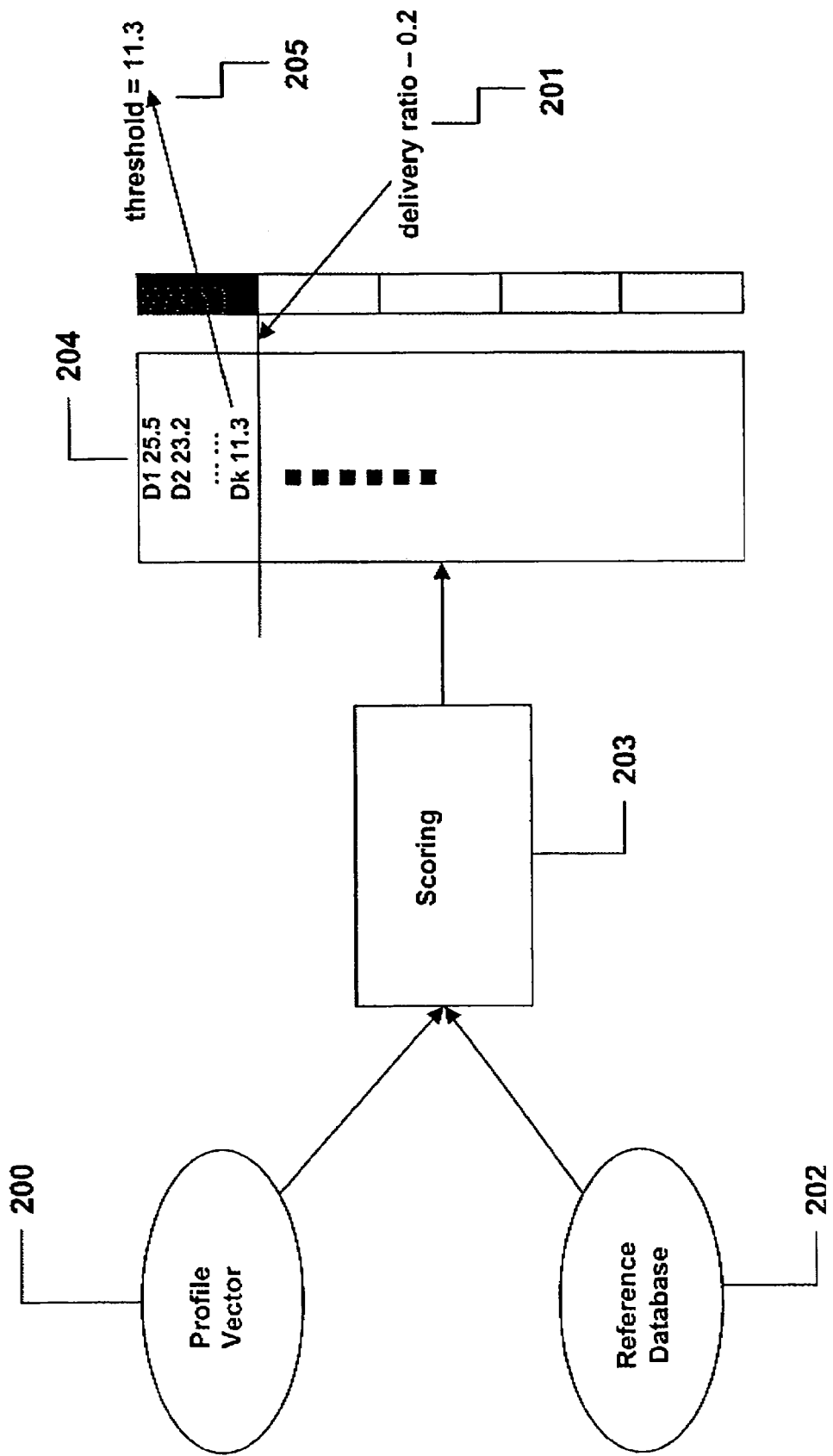
FIG. 2a is a graph that illustrates a method according to the present invention for setting an initial threshold of a user profile in an information retrieval/filtering system.

The approach to filtering information in accordance with the invention involves the steps of profile creation and filter construction. We present profile creation first and describe filter construction subsequently, based on the use of profiles created by the methods described below.

Profile creation involves the steps of feature extraction from example documents, feature weighting, and threshold setting, with reference to a scoring function for the features and a utility function. The scoring function determines the score of a document based on the features of the document that are shared with the features in the profile. The utility function gives the relative value of delivered documents that are correctly classified (the "true positives") to delivered documents that are incorrectly classified (the "false positives"), as determined by or for the user. The threshold is the score such that documents scoring at or above threshold are accepted by the system. The threshold is ideally set to a score that maximizes expected utility.

FIG. 1 illustrates the general method for filtering relevant information from a corpus of documents 101 or from a stream of documents 130. According to one embodiment of the invention, a document is a text file containing one or more strings of characters or other symbols that are used to form more complex constructs. For example, strings of characters may form words, phrases, sentences, and paragraphs. The constructs contained in the documents are not limited to constructs or forms associated with any particular language. Furthermore, the feature types that may be used are not limited to linguistic strings or symbols, but can include other feature types such as: structural features, such as the number of fields or sections or paragraphs or tables in the document; physical features, such as the ratio of "white" to "dark" areas or the color patterns in an image of the document; annotation features, the presence or absence or the value of annotations recorded on the document in specific fields or as the result of human or machine processing; derived features, such as those resulting from transformation functions such as latent semantic analysis and combinations of other features; and many other feature types that may be apparent to practitioners of the art.

Documents are pre-processed 131 in order to insure that the features of the documents have been identified and are in a form that the filter can interpret. Many alternative techniques are known in the art for extracting and representing features, as well as for storing the features for efficient access by the system (as would be the case in an inverted index to a database of documents) or for sorting or ranking features for efficient processing. In the preferred embodiment, the documents in the corpus of documents 101 or stream 130 are processed one document at a time. For each document, features are extracted so as to obtain a term vector. In an alternative embodiment, the corpus of document 101 can be segmented into small subsets of documents or the stream of documents 130 can be collected or buffered to form a subset of documents. Such subsets of documents can be processed together to increase efficiency. Such subsets can also be used to define new super-document units for processing, for example, reflecting those documents within a set that share specific characteristics, such as being on the same topic. Practitioners of the art can readily appreciate the many alternative strategies and techniques one might use to establish such super-document groups. Furthermore, any document can be analyzed into sub-documents using the methods of U.S. Pat. Nos. 5,907,840, 5,999,925, 6,115,706, 6,205,443, and 6,377,947, which are herein incorporated by reference, and each sub-document of the document can be processed such that the features of one or more of the sub-documents of the document are used by the filter to score the document.

In this invention, a document for purposes of processing can be defined as a literal document, as made available to the system as a source document; sub-documents of arbitrary size; collections of sub-documents, whether derived from a single source document or many source documents, that are processed as a single entity (document); and collections or groups of documents, possibly mixed with sub-documents, that are processed as a single entity (document); and combinations of any of the above.

In this embodiment, the user profile 102 incorporates a feature or term vector 103 and a score threshold 104. The term vector 103 is used to generate a score in step 105 for each document in the corpus of documents 101 or in the stream 130. In alternative embodiments of the invention, not every document in a corpus 101 or stream 130 is scored, but only those documents that satisfy some external condition, such as having been added to the database of documents 101 or appeared in the stream 130 within the most recent time interval, t. Other external conditions can easily be imagined by practitioners of the art. In an alternative embodiment, the corpus of documents 101 or the stream of documents 130 can be segmented into small subsets of documents.

The features or terms that are used in the profile 103 can be derived from example documents or other text that the user or system has provided as a characterization of the topic or category to be filtered. In one embodiment of the invention, the terms in the profile 103 are extracted from a body of text, possibly in a set of documents, in a two-step process that involves first identifying the features in the text and second ranking the features according to a scoring algorithm or selection principle.

One method that the invention uses for identifying features is to parse the text and treat any phrase or word in a phrase of a specified linguistic type (e. g. , noun phrase) as a feature. Such features or index terms can be assigned a weight by one of several alternative methods known in the art. One such method assigns to term t a weight that reflects the observed frequency of t in the unit of text ("TF") that was processed times the log of the inverse of the distribution count of t across all the available units that have been processed ("IDF"). This "TF-IDF" score is typically computed using a document as a processing unit and the count of distribution based on the number of documents in a database in which term t occurs at least once. For any set of example documents or text that might be used to provide features for a profile, the extracted features may derive their weights by using the observed statistics (e. g. , frequency and distribution) in the set itself. However, in a preferred embodiment of the invention, the weights on terms found in the example text(s) may be based on statistics from a reference corpus of documents. In other words, instead of using the observed frequency and distribution counts from the example set of documents, each feature in the example set may have its frequency set to the frequency of the same feature in the reference corpus and its distribution count set to the distribution count of the same feature in the reference corpus. In an alternative embodiment of the invention, the statistics observed in the example documents may be used along with the statistics from the reference corpus in various combinations, such as using the observed frequency in the example set, but taking the distribution count from the reference corpus.

The final selection of features from example documents may be determined by a feature-scoring function that ranks the terms. Many possible scoring or term-selection functions might be used and are known to practitioners of the art. In one preferred embodiment, the following scoring function, derived from the familiar "Rocchio" scoring approach, is used:

$$TFW(t) = IDF(t) \times \frac{\sum_{D \in DocSet} TF_D(t)}{R}$$

Here the score of a term, t, in a document set ("TFW(t)") is a function of the inverse document frequency (IDF) of the term in the set, the frequency count of t in the set, and the total number of documents in the set that are known to be relevant ("R"), where IDF is defined as $$IDF(t) = \log_2(N/n_t) + 1$$

where N is the count of documents in the set and nt is the count of the documents in which t occurs.

Once scores have been assigned to features in the document set, the features can be ranked and all or a subset of the features can be chosen to use in the feature profile for the set. In a preferred embodiment of the invention, features from example documents are chosen in descending order of score down to a rank (e. g. , 10, 20, or 50) that is specified by the algorithm used in filter construction and just those top-ranked terms are used for the feature profile.

The scoring in step 105 is performed using standard statistical analysis techniques such as vector space-type scoring, though many alternative scoring methods are possible. In a vector space-type scoring system, a score is generated by comparing the similarity between a profile (or query) Q and the document D and evaluating their shared and disjoint terms over an orthogonal space of all terms. For example, the similarities score can be computed by the following formula (though many alternative similarity functions might also be used, which are known in the art):

$$S(Q_i, D_j) = \frac{Q_i \cdot D_j}{|Q_i| \cdot |D_j|} = \frac{\sum_{k=1}^{t}(q_{ik} \cdot d_{jk})}{\sqrt{\sum_{k=1}^{t} q_{ik}^2} \cdot \sqrt{\sum_{k=1}^{t} d_{jk}^2}}$$

where $Q_i$ refers to terms in the profile and $D_j$ refers to terms in the document. The vector space-type scoring technique can be illustrated on the following sample set of profiles and documents, which assumes that words have been used as the features to establish terms.

| Terms | $Q_1$ | $Q_2$ | $D_1$ | $D_2$ |
|---|---|---|---|---|
| dog | 1 | 1 | 2 | — |
| cat | 1 | — | — | 1 |
| hat | 1 | — | 1 | — |
| bat | 1 | — | — | — |
| mat | 1 | 1 | — | — |
| hut | — | 1 | 2 | — |
| cut | — | 1 | — | 2 |
| luck | — | — | 3 | — |
| buck | — | — | 1 | — |
| muck | — | — | — | 3 |

In This table, the Terms column lists a unique union of all the terms contained in the two documents $D_1$ and $D_2$. The values listed under $D_1$ and $D_2$ refer to the frequency of those terms as they appear in the documents. The values listed under $Q_1$ and $Q_2$ refer to the frequency of the terms as they appear in the profiles corresponding to $Q_1$ and $Q_2$. Using the similarity function illustrated above, the similarity score of the profile $Q_1$ to document $D_1$ is computed as:

$$S(Q_1, D_1) = \frac{(1 \cdot 2) + (1 \cdot 1)}{\sqrt{1^2 + 1^2 + 1^2 + 1^2 + 1^2} \cdot \sqrt{2^2 + 1^2 + 2^2 + 3^2 + 1^2}} = 0.33.$$

Similarly, the similarity score of the profile $Q_1$ to document $D_2$ is computed as: $S(Q_1, D_2) = 0.12$.

As can be seen from the above example, the similarity score of profile $Q_1$ to document $D_1$ is higher than the similarity score of profile $Q_1$ to document $D_2$. As a result, the similarity score provides a relative measure of the relevance of a document to the profile. A highly-scored document is more likely to be relevant to a profile than a low-scoring one.

The score threshold 104 is used for deciding to accept or reject documents in step 106 with respect to each document based upon the scoring obtained in step 105. If the score of a document is above the score threshold, the document will be accepted, otherwise it will be rejected. A high score threshold would only allow a few high-scoring documents to be accepted. Most of these high-scoring documents may be expected to be relevant to the profile. On the other hand, a low score threshold would allow more documents to be accepted. However, the ratio of actually relevant documents among these accepted documents—referred to as "precision"—may be low. The correct threshold can only be determined according to the user's actual preference concerning the number of documents accepted as well as the expected precision of the accepted documents.

Once a threshold is established, the filter can use it to make a decision whether to accept or reject a document. The combination of steps 105 and 106 comprise filter 120. In particular, as illustrated in FIG. 1, the thresholding operation in step 106 determines whether a document will be delivered to the user in step 107. Documents yielding a score from step 105 above the score threshold 104 are accepted as relevant in step 106 and delivered to the user in step 107. Conversely, documents yielding a score below the score threshold 104 are rejected as not relevant and discarded.

While the illustration above utilizes a single scoring mechanism, it is clear that alternative scoring mechanisms might be used singly or in combinations in filtering. For example, a similarity score of a profile to a document might be supplemented with a "Boolean" score, based on a specific constraint or condition that would be required for a document. This would amount to a requirement, implemented in the filter, that only documents that have a similarity score above the desired threshold and also satisfy the constraint (e. g. , contain the term "cat") be delivered to the user. In general, multiple alternative methods for evaluating (scoring) a document may be used in a filter.

It is also clear that, while the illustration above uses a single type of feature (word-based terms), alternative feature types, including, but not limited to, linguistic phrases and their constituents, identified entities such as "names" or "places" or "products", and annotations of all kinds, might be used to represent the document or the profile, either singly or in combinations. One simple example of this might involve the feature "date"—the time stamp or publication date on a document—used in combination with terms that represent the document's content. A profile might specify that a document be accepted if and only if it both scores above threshold in term features and also has a date that is after a specified time. A filter might implement this requirement by using a similarity scoring function for the terms and a numerical test ("greater-than") on the date feature of the document; it would accept documents only if the term features of the documents scored about the threshold for the term features of the profile and the date on the document was greater than the date given in the profile.

In general, in cases where the document or profile uses features of different types, it may be appropriate for different scoring functions to be used for each different feature type.

The filter will implement the requirements of each scoring function for each feature type and make its decision based on some combination of the information that derives from each score or requirement.

Setting a threshold for a profile can be accomplished in a variety of ways. There are at least two general cases that should be contrasted: (1) the case where there are insufficient data among example documents or where there is only a set of features and no example documents and (2) the case where there are sufficient data among example documents.

When there are insufficient data among example document or when there is only a set of features associated with a profile, it is necessary to use surrogate data to establish a scoring threshold. FIG. 2a illustrates such an embodiment of the invention used to set an initial score threshold by using a delivery ratio estimation 201 and a reference set of documents 202 whose relation to the example documents may not be known. The set of reference documents 202 is identified as the reference database. The profile term vector 200 is used to assign a score 203 to each reference document. The reference documents are sorted by their scores to generate a sorted list of reference documents 204. The expected delivery ratio 201 directly provided by the user or calculated based on the sample of example documents provided by the user or set by default determines a cutoff point 205 at the list. Assuming that the user expects to accept a fraction r of documents from the corpus of documents (e.g. , 10%), the cutoff point will be the kth document in the ranked list, where K=r×N, and N equals the number of documents in the reference database. (In cases where the user does not provide r, r may be estimated either (a) by determining the ratio of the example documents to the larger set of documents from which the example documents were chosen or (b) by using a default ratio, e.g. , 1:5,000 ⇒0.0002.) The score of the document at the cutoff point 205 is taken as the assigned threshold. In special cases when K<1 or when K>N, heuristic extrapolation is applied.

When there are sufficient data among the example documents, the set of example documents can be supplemented with documents that are believed to be not in the same category or topic. In some embodiments, the example documents may be divided into subsets and one or more of the subsets may be reserved for use in extracting features and other subsets may be reserved for use in setting thresholds. Any subset used for setting thresholds will need to have or to be supplemented with data (documents) that are believed to be not in the category or topic of the example documents. In many typical cases, the information that is available for the system to use in training mixes example (on-topic) documents (the "positive" class) with others (not on-topic; the "negative" class) in a collection that the system can use. In such cases, the entire mixed set of documents may be regarded as the "training" set and the development of any individual filter (for a specific set of examples) will require segregating the example (on-topic) documents from the other documents at various stages. For example, in a mixed training set, a profile's features might be extracted from just the subset of positive documents, while the setting of the profile's threshold might use the entire mixed set of both positive and negative documents. Threshold setting in such cases may use the delivery-ratio method, but may also use more direct methods, such as ranking the documents in the mixed set by score and choosing a score at the rank that gives the best observed performance. This latter case is described in greater detail below and represents the default case in the embodiments of this invention.

Threshold setting typically requires reference to some model or measure of the user's desired outcome or preferences for filtering. Such a measure is commonly referred to as "utility" and often expressed as a function of the positive and negative documents that the filter selects. There are many such functions known to practitioners of the art.

In the following for purposes of exposition, we describe a particular type of utility function based on specific information-theoretic measures, however, the embodiment of the invention does not depend on the use of any one such specific utility measure. In particular, we recognize that utility measures may be appropriate that include such considerations as the size of the filter (model) as it is stored in memory, the complexity of the filter (model) in terms of number of steps, or processing time, it requires to process data, etc., and other such pragmatic measures of the process or combinations of such measures.

A preferred embodiment of the invention uses one of several possible linear utility functions, given schematically as follows:

$$U=aR^+ +bN^+ +cR^- +dN^-$$

where $R^+$ is the count of positive ("relevant") documents in the filtered (delivered) set, $N^+$ is the count of the negative ("non-relevant") documents in the delivered set, $R^-$ is the count of the positive documents that have been missed (not delivered with respect to a database or stream), and $N^-$ is the count of the negative documents that have been (correctly) not delivered.

Figure 4:
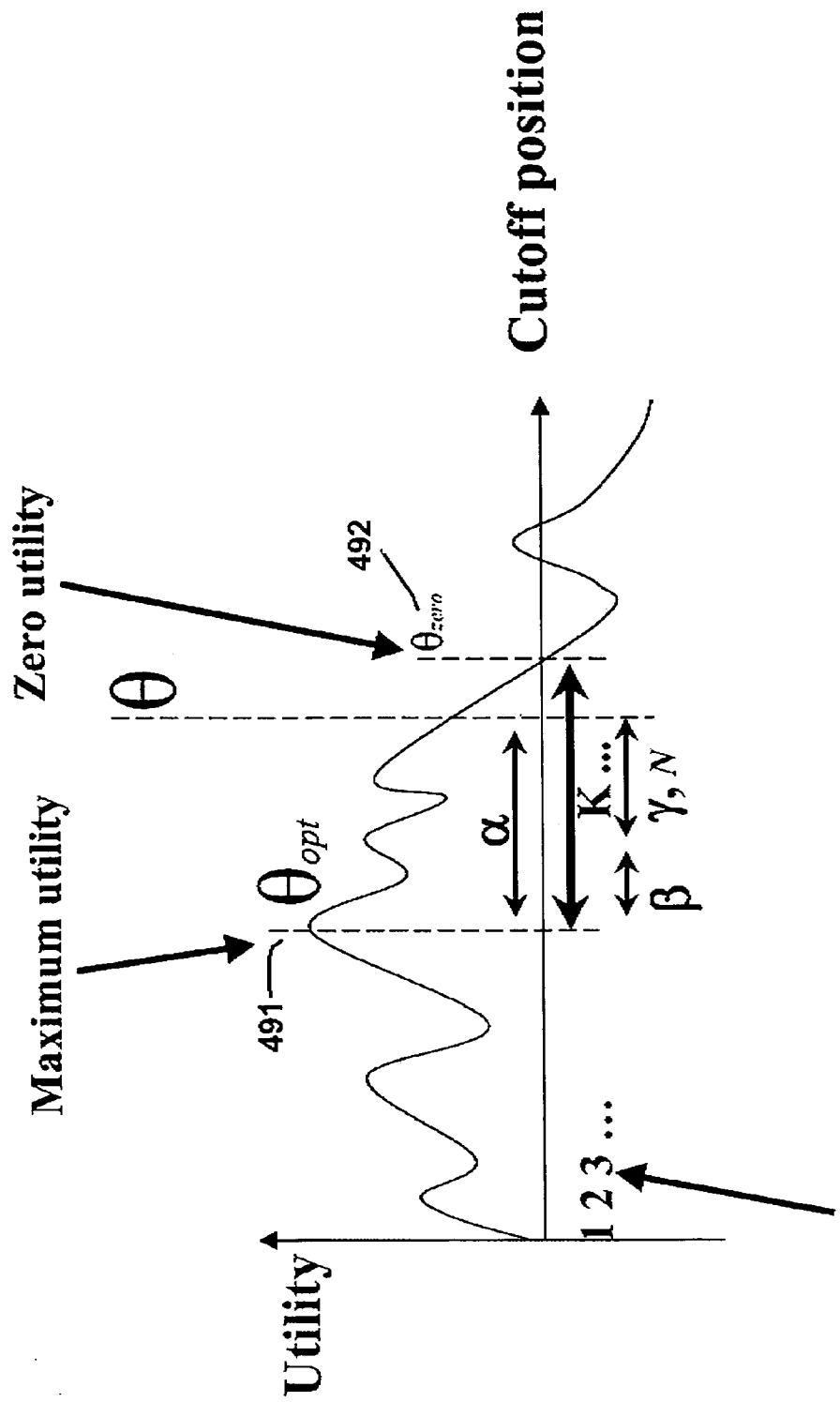
FIG. 4 is a graph that illustrates the parameters of the present invention for setting utility threshold.

The change in utility (U) can be calculated as a function of the ranking of documents in the filtered set based on their scores, as illustrated in FIG. 2b and FIG. 4. In FIG. 2b, a set of documents 250 is listed along with their corresponding scores 260. Each document in the set 250 also is associated with a label or judgment 270 indicating whether the document is a positive ("R") or negative ("N") response to the user's information need. At each rank in the order of the documents 250 a utility score calculation 280 is shown, based on the linear utility function above with a=3, b=−2, and c=d=0. We can note the point in the ranking at which the value for U is greatest. This we call $\theta_{opt}$ 291 (491). We can also note the point in the ranking at which the value for U first reaches 0 or lower. This we call $\theta_{zero}$ 292 (492).

Utility scores can be used to help set score thresholds when evaluating the scoring characteristics of a filter. In particular, a filter can be used without a threshold (i.e., with threshold set to 0) to score documents from a mixed set of positive and negative examples. When these are sorted in descending order of score, the system can note the point in the rank at which the number of "correct" documents compared to the number of "incorrect" documents causes the set of documents at that point and above to fall below a desired utility score. The score on the document at that point in the ranked list can be taken as an initial score threshold for the profile.

In an optional additional step used in one embodiment of the invention, the full profile established in this process, with terms, weights, and a score threshold, can be used to score another as-yet unseen subset of the original training documents mixed with non-topic documents. In this phase of training, the profile is used to filter documents from the new mixed set and the accepted set of documents is compared to the rejected ones. Based on the ratio of "correct" to "incorrect" documents in the accepted group, as well as the ratio of accepted "correct" documents to rejected "correct" documents, the profile score threshold can be further adjusted—raised, lowered, or left unchanged—as a final calibration of the profile threshold for use with unseen new documents.

FIG. 3 illustrates an embodiment of the present invention used to set the score threshold 104 in step 110. In step 301, documents from the training set or subset of the training dataset, possibly not overlapping with the subset of the dataset used for term extraction, referred to as the thresholding dataset, are scored against the profile vector, and are sorted in descending order according to their scores. At each position in the ranked list, a utility value $U_i$ can be computed by assuming a threshold that is equal to the score of the document at that position. Therefore, in step 302, each position yields a candidate score threshold and a corresponding utility value. Thereafter, the "optimal" utility threshold, $\theta_{opt}$ 291 (491) is determined in step 303 as the score where the utility is maximum over the thresholding dataset and the "zero" utility threshold, $\theta_{zero}$, 292 (492) is determined in step 304 to be the highest score below $\theta_{opt}$ 291 (491) where the utility is zero or negative (or the lowest score should the utility fail to reach zero). Using the optimal utility threshold and the zero utility threshold, a new profile utility threshold is then calculated in step 305 by interpolating between the empirical optimal utility threshold and the zero utility threshold over the thresholding dataset using a beta-gamma function 306 as follows:

$$\text{threshold} = \alpha * \theta_{zero} + (1-\alpha) * \theta_{opt}$$

$$\alpha = \beta + (1-\beta) * e^{-M*\gamma}$$

where $\theta_{opt}$ is the score of the document where the utility is maximum $\theta_{zero}$ is the highest score below $\theta_{opt}$ where the utility is zero or negative M is the number relevant documents in thresholding dataset and $\alpha$, $\beta$, $\gamma$ are parameters This method of setting the thresholding is referred to as the beta-gamma thresholding algorithm (or "beta-gamma" method) in the following. The parameters of this algorithm are illustrated schematically in FIG. 4. This algorithm and its background are described in greater detail in U.S. Pat. Nos. 6,430,559 and 6,463,434, which are herein incorporated by reference.

Filter construction involves the steps of determining how to construct profiles from example documents, whether more than one profile is necessary, and, if so, how to combine profiles into one or more filters. Note that example documents may be available to the system in a variety of forms. One source is a set of positive-only documents. In such cases, the system (or user) may supplement the set with additional documents that are believed to be non-positive, for use in various stages of training. Another source may be a set of labeled documents, where a document's one or more labels may be used to identify a positive set. In the operations of the present invention, we assume that example positive documents are available along with contrasting non-positive documents in a labeled dataset, though practitioners of the art will easily understand how to adapt the invention to deal with cases where the data is presented only as a set of positive examples.

In filter construction, we can use monolithic, multiplex, and cascade filter types. We can use n-fold cross-validation to choose the construction and aggregation method and to make other representational decisions, such as which of several term-extraction methods and term counts to use.

Cross-validation begins by splitting the provided dataset at random into n distinct segments. Then filters are trained using n−1 segments and tested on the remaining segment. This process is repeated for each of the n possible choices for the segment that is omitted from the training process, resulting in a vector of n utility measures. The utility vector can be used in various ways to assist the system choose the best filter (model) for the dataset. Such a procedure allows the use of a high proportion of the available data for training, while also making use of all examples in evaluating the cross-validation utility measure.

Monolithic filters can be constructed from one or more example documents by processing the example documents to yield a profile. All of the example documents can be processed to identify features; these can be ranked according to one or more feature extraction techniques. A number of top-ranked features, along with the weights they are assigned by the extraction algorithms, can be chosen as a weighted feature vector for the profile. This feature vector can be used to score all the known correct examples and a sample of known incorrect examples according to the scoring function chosen (e.g. , the vector-space similarity measure described above). A threshold for the profile can be set according to the beta-gamma method or other methods described above. However, such a filter may not always be a good classifier for the topic represented by the example documents, since using the same documents for feature extraction and for threshold setting can result in an "overfitted" filter. In order to overcome this problem, if there are sufficient numbers of example documents, n-fold cross-validation is used to determine an optimal representation for a topic/category/information need. That is, when constructing monolithic filters from training examples, various feature extraction methods and feature counts may need to be considered to build an optimal filter representation. This can be achieved automatically using cross-validation.

Table 1 lists the feature extraction methods (in this case, a single method, Rocchio, as given above) and term counts that could be used to select features for the term vector of a profile. The first column gives the term extraction technique, denoted as E in the following. The remaining columns represent N, the number of terms that are chosen by the method from the example documents to be used as a term vector for the profile. When using a feature extraction method such as Rocchio, terms are ranked in descending order of the weights assigned by the extraction method and the top N terms and associated weights are chosen as a profile to model the information need. In practice, the weights assigned by the feature extraction method are treated as coefficients on the term (feature) weights that are otherwise assigned by the scoring function. For example, in the typical case of a vector-space scoring of term vectors using a similarity function as illustrated above, the "native" term weights are based on term distribution statistics as collected from a reference database (possibly identical to the set of example documents), such as the commonly used "TF-IDF" weight. In such a case, the "native" (TFIDF) weight of the term would be multiplied by the weight (coefficient) assigned by the extraction method to yield the final weight of the term in the feature vector of the profile. Those skilled in the art will appreciate that many other term extraction techniques and other term counts and other term weighting approaches could also be used.

TABLE 1

Possible term extraction method and term count table (not limited to these values)

| Extraction Method (E) | Feature Count (N) | | | | | | |
|---|---|---|---|---|---|---|---|
| Rocchio | 10 | 20 | 50 | 100 | 200 | 300 | 500 |

In practice, given a training dataset Train that is partitioned into n folds or subsets this optimization procedure translates into taking each combination of feature extraction method E and number of terms N and performing the following steps, referred to as the Monolithic Construction Algorithm:

MonolithicConstructionAlgorithm(Train, n)
1. Split Train into n subsets or folds indexed using 1 to n
2. Repeat steps 2 to 5 for all combinations {E, N} listed in _, thereby generating a utility vector, Utility$_{E,N}$, for each combination.
3. TotalFoldUtility=0
4. For f=1 to n do
   TotalUtility=0
   For i=1 to n and i f do
      Set ExtractionDB to the Train less subset f and subset i.
      Build Filter F$_{f,i}$
         Do feature extraction on ExtractionDB using the {E, N} extraction combination.
         Optimize the threshold for F$_{f,i}$ using subset i.
         Do a blind test using F$_{f,i}$ on subset f, thereby generating a utility value U$_{f,i}$
         UtilityArray[f][i]=U$_{f,i}$
      EndFor
5. EndFor
6. Select BestE and BestN as the combination {E, N} based upon a choice function.
7. Return a filter F that is trained on Train
   Do feature extraction on Train using the {BestE, BestN} extraction combination.
   Optimize the threshold for F using Train.

Another variation of MonolithicConstructionAlgorithm could use different numbers of folds for each of the tasks of extraction, threshold setting, and blind testing. In the embodiment described above, the number of folds or subsets is set for each task as follows: extraction uses n−2 folds, threshold setting uses one fold and blind testing uses one other fold. Other combinations could alternatively be used.

In our current embodiment, MonolithicConstructionAlgorithm constructs all possible filters and evaluates them on the held-out subset. Another variant of MonolithicConstructionAlgorithm could be to sample the possible filters that could be constructed to test a held-out fold/subset.

In this above embodiment various choice functions can be used. One possible embodiment could be based upon taking the average of all utilities in the UtilityArray and selecting the combination with maximum average utility as the combination E and N to build a filter. This could be accomplished as follows:

SelectExtrMethodAndCountUsingAverageUtility(UtilityArray)
1. Repeat steps 2 to 4 for all combinations {E, N} listed in _ thereby generating a utility
2. For f=1 to n do
   TotalUtility=0
   For i=1to n and i f do
      TotalUtility=TotalUtility+UtilityArray[f][i]
   EndFor
   TotalFoldUtility=TotalFoldUtility+TotalUtility/n−1
3. EndFor
4. AvgUtility$_{E,N}$=TotalFoldUtility/n
5. Select BestE and BestN as the combination {E, N} that provides the highest average utilityAvgUtility$_{E,N}$.

Figure 5A:
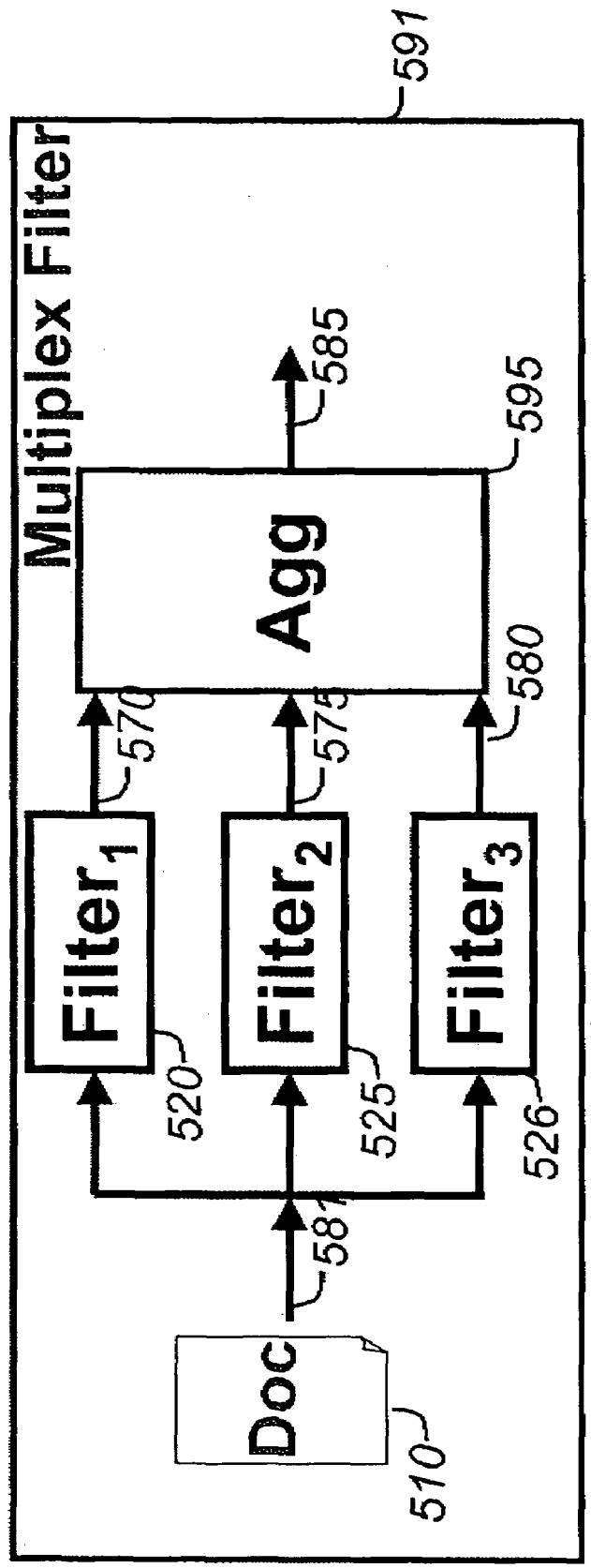
FIG. 5a is an illustration of a multiplex filter according to one embodiment of the present invention.
Figure 5B:
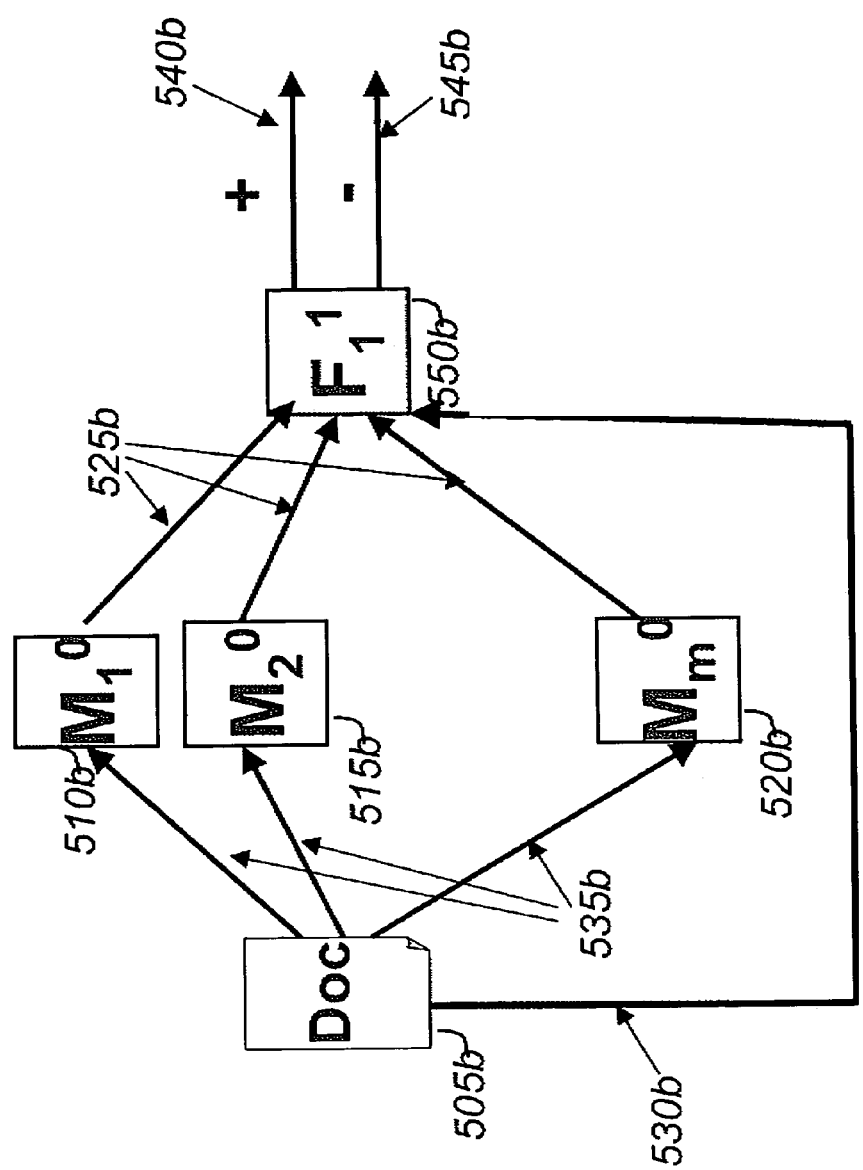
FIG. 5b is an illustration of a stacked multiplex filter according to one embodiment of the present invention.

A multiplex filter 591 with three element or constituent filters F$_i$ 520, 525, and 526, is illustrated in FIG. 5a. (A multiplex filter is not limited to three constituent filters as given for illustration in FIG. 5a, rather can consist of i such filters, for any i.) This multiplex filter 591, made up of constituent filters 520, 525, and 526, accepts or rejects a document 510 (where document 510 is represented in terms of its features as defined above) based on some interpretation of the independent scoring of each constituent filter F$_i$. That is, each component filter 520, 525, and 526 accepts as input the features and associated values that describe the document 510 and scores them against the component filter profiles. The individual filter scores 570, 575, 580 are then aggregated to produce an output 585 using a function 595. Various aggregation functions 595 can be used for interpreting the scores of a set of filters 570, 575 and 580, ranging from some simple combination of binary outcomes (e.g., the sum of the "votes" of each filter) to a weighted, possibly non-independent scoring based on the interaction of filters. In general, classification of a document 510, Doc, using multiplex filters is based upon the following procedure where each component filter is assigned a weight Wgt$_i$ (e.g., uniform weight or weight proportional to its performance expectation):

$$\text{Class}(Doc) = \text{Sign}\left(\sum_{t=1}^{T} Wgt_t Model_i(Doc)\right)$$

Here Model$_i$(Doc) (corresponding to 570, 575, and 580) yields +1 if the filter accepts the document or −1 if the filter rejects the document. And Sign(.) yields a +1 if its argument is 0 and −1 otherwise.

An alternative means of aggregating multiplex filters is based upon a thresholded aggregation function as follows:

$$\text{Class}(Doc) = \begin{array}{ll} +1 & \text{if } \sum_{t=1}^{T} Wgt_t Model_i(Doc) > \theta \\ -1 & \text{otherwise} \end{array}$$

As a variant of this embodiment, Model$_i$(Doc) could be interpreted as the raw score output by the component filter i. As yet another variant, each component filter could generate both a binary output (+1 or −1) and the actual score, which is weight-summed to yield an overall sum that is thresholded using θ.

Another embodiment of an aggregation filter is based upon building a filter profile based upon features derived from the component filters such as 520, 525 and 526 or the original document features 581 or a combination of both. The aggregation filter in this case is more general than the previous filter, consisting of a threshold value and a collection of features, where each feature has value and a weight associated with it. These features can be based either on the raw score value generated by a component filter or a thresholded binary value (+1/−1) or a combination of the above. In addition, the features originating directly from the document may also be used. The aggregation filter parameters can be determined through a learning process, which is described below. A multiplex filter can be regarded as a stacked filter.

Figure 5C:
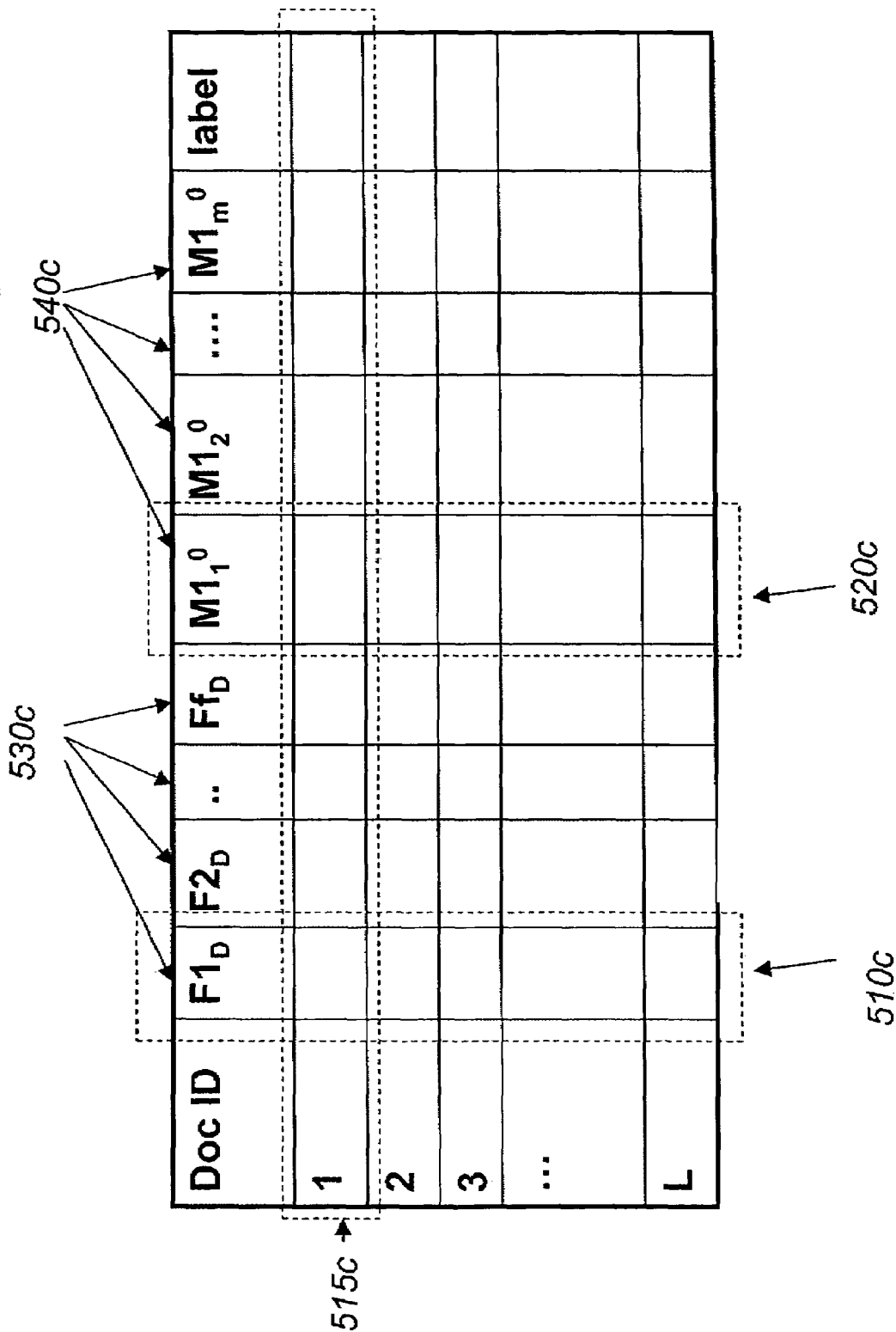
FIG. 5c is an illustration of a document x term array with source features and derived features based on filter processing.
Figure 5D:
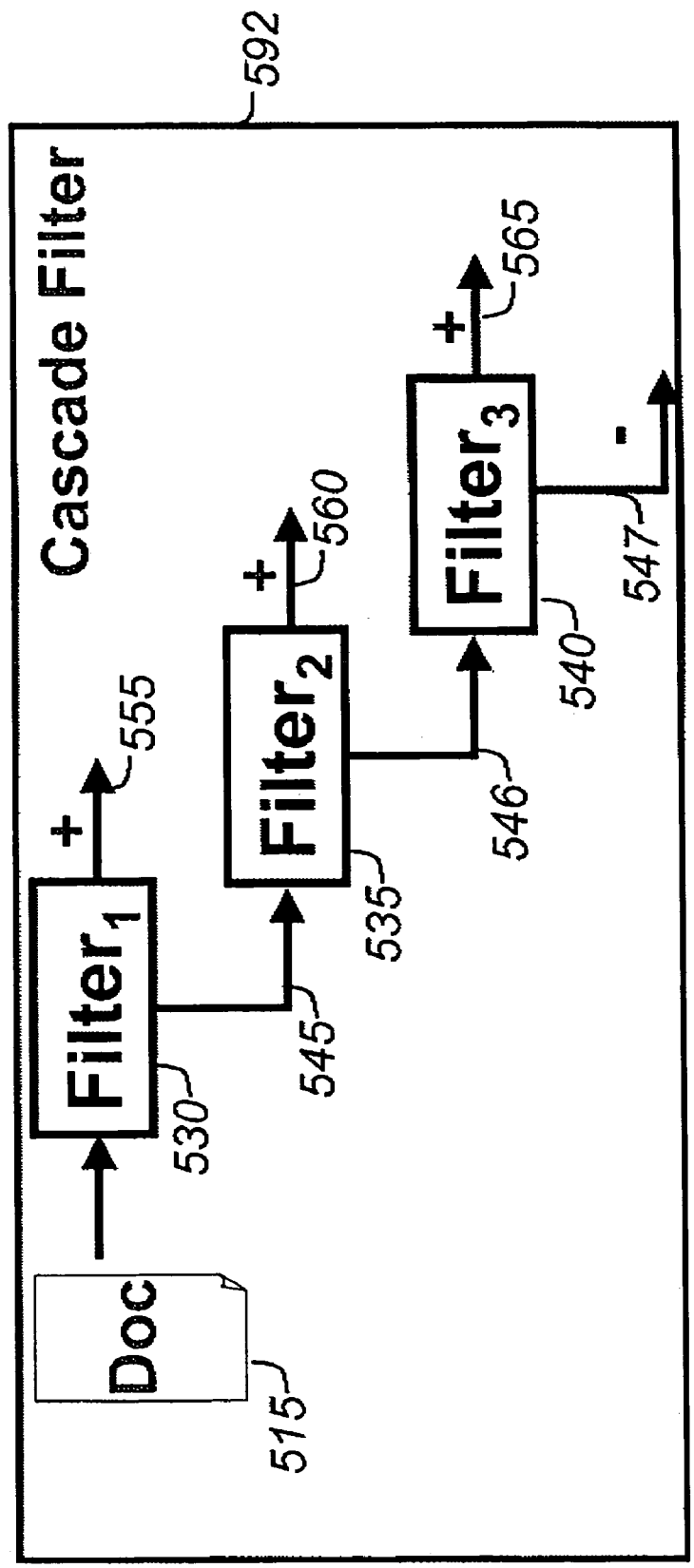
FIG. 5d is an illustration of a cascade filter according to one embodiment of the present invention.
Figure 5E:
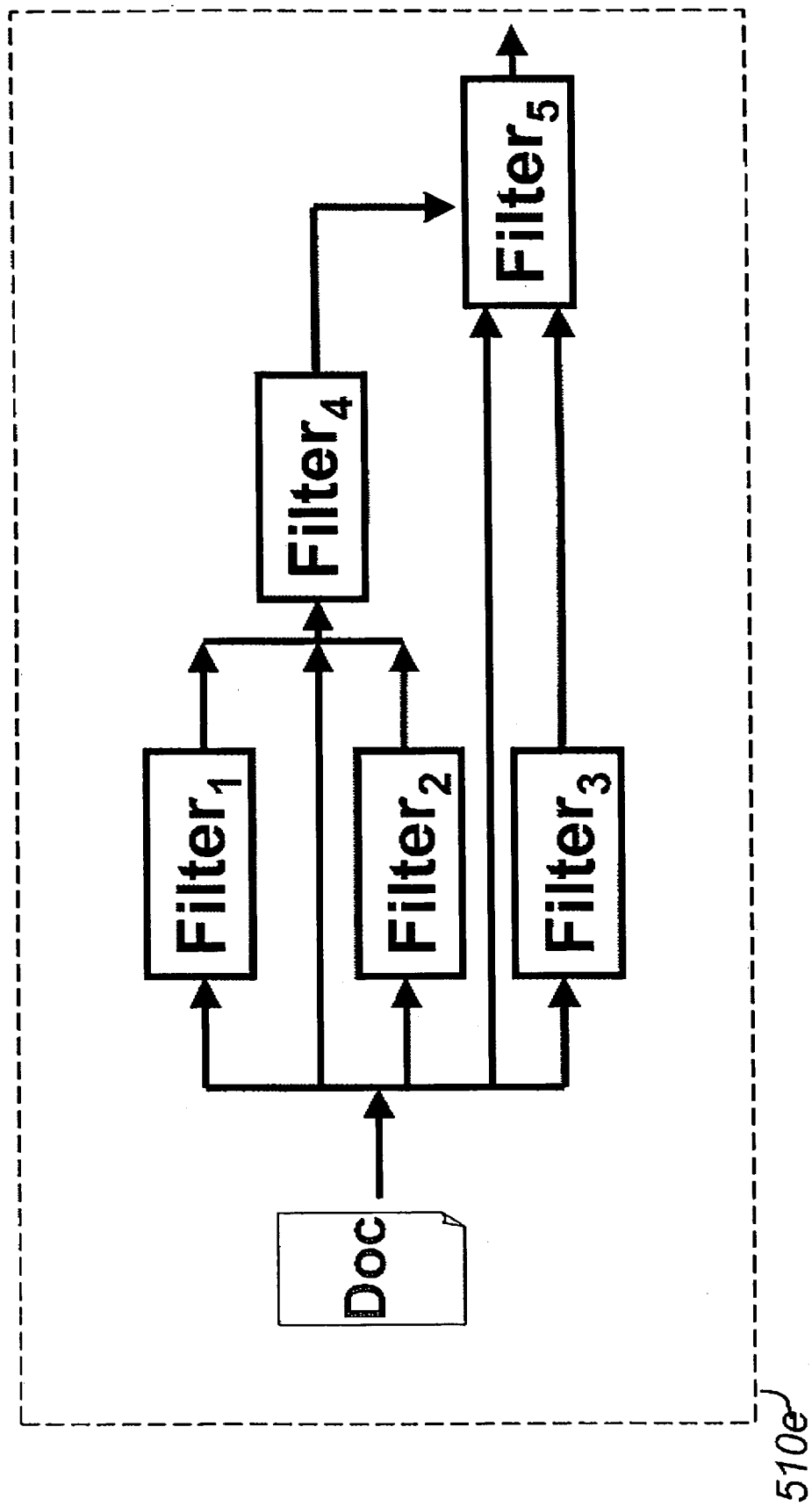
FIG. 5e is an illustration of a multi-level stacked filter according to one embodiment of the present invention.

Though the presentation here is limited to one level of stacked filter, two or more levels of stacked filter can also be accommodated using this framework. As illustrated in FIG. 5e, various lower-level filters can interact and add information to the stream that passes to higher-level filters. These, in turn, can process information from all levels, as needed. In the case of FIG. 5e, stacked filter 510e is a two-level stacked filter.

The embodiment is not restricted to two-level stacked filters or to a specific number of constituent filters, rather can have an arbitrary number of levels and constituents, connected in arbitrary fashion as required by the stacked filter. In addition, the component filters in a stacked filter can be any type of filter, such as, but not limited to, a monolithic filter, a multiplex filter, a cascade filter, a support vector machine, a probabilistic model, etc. In addition, the component filters can be composed of heterogeneous combinations of filter types.

The construction algorithms for multiplex filters use the monolithic filter construction procedure (described above) as an intermediate step in constructing component filters. A number of preferred embodiments are presented.

The first preferred embodiment is based upon bagging, whereby each filter is constructed from a sampled subset of the training data. Samples can be constructed using any of (but not limited to) the following techniques: sampling with replacement; sampling without replacement; or n-fold partitioning of the data. When using sampling with replacement each filter's training dataset is generated by randomly drawing, with replacement, a specified number of examples from the training dataset (typically equal to, but not limited to, the size of the training data). The following outlines the main steps in this embodiment:

MultiplexConstructionAlgorithmBag(Train, n)
   Let m be the number of instances in Train
   For each of t iterations:
      Sample m instances with replacement from Train to create a sample S.
      Build Filter F using MonolithicConstructionAlgorithm (S, n)
      Store the resulting filter F in Models[t]

To those skilled in the art, it will be appreciated that other sampling techniques can also be used. An extreme form of sampling is based upon splitting the database into n-folds or subsets and constructing n filters, where each filter i is constructed using a subset of the database consisting of n−1 folds (i.e., each fold i is ignored in the construction of filter i, while the remaining n−1 folds are used). Alternatively, multiplex filters or the constituent filters in multiplex filters can be constructed using alternative document features and abstractions or combinations of features and abstractions, as noted above.

When using a stacked multiplex filter, the weights associated with each of the constituent features $525b$ and $530b$ along with the filter threshold must be determined. The following algorithm outlines an approach to achieve this based upon a stacked filter. This presentation is aided by FIGS. $5b$ and $5c$:

Given two subsets of the training data, D1 and D2, where each example document is represented in terms of either (a) both the source features and derived features or (b) only the derived features. These features are defined as follows:
      Source features are the features directly provided to the system by the pre-processing of the document. These correspond to columns $530c$. Therefore, column $510c$, for example, corresponds to the source feature scores $F1_D$ for each document.
      Derived features that are computed by filters earlier in the stack of filters. In our example, these earlier or lower level filters (models) are $510b$, $515b$ and $520b$. Each of these features is computed by the filter from which it is derived. That is each lower level filter (e.g., $510b$) processes (scores) each example $535b$ in the training database. In FIG. $5c$, row $515c$, for example, represents document DOC ID 1. This can result in a binary value (shown as a positive output $540b$ and a negative $545b$ outPut) or an actual score (that is, in this case, the document $505b$ is scored against the filter and the similarity score taken as the actual score) or both. In the example FIG. $5c$, for explanation purposes, this is limited to the score value. This process results in adding a column $520c$ (corresponding to the result of scoring each document against filter $510b$) to the training dataset where each cell value corresponds to the score between each document and the model $515b$. Therefore, the columns $540c$ represent the results of scoring the documents against each model $M_1$ to $M_m$.

Set the weights of source features to those weights assigned using the source feature extraction algorithm
   Determine the weights of derived features. In one preferred embodiment, we use a uniform value, viz., 1/F, where F is the number of derived features. In another embodiment, the value is utility based.
   The threshold for the stacked filter $550b$ can be set using any of a number of threshold-setting techniques with respect to a specified utility measure over the D2 dataset. One such method is the beta-gamma thresholding algorithm described earlier.

In another preferred embodiment the weights associated with each of the derived features are calculated using any term extraction technique. One such technique could be to calculate the centroid value for all input features.

Another preferred embodiment could use an alternative modeling strategy for the stacked filter. For example, a neural network could be used as a means of creating an aggregation function.

An alternative preferred embodiment for constructing multiplex filters is based upon boosting. Boosting iteratively constructs component filters, progressively focusing on examples that have been misclassified by earlier constructed component filters. The main steps in this approach are outlined here:

MultiplexConstructionAlgorithmBoost(Train, n)
   Split Train into subsets D1, D2.
   Assign equal weights (probability of selection) to each instance in D1
   For each of t iterations:
      Randomly sample (using the bias represented through the weight assigned to each example) m instances with replacement from weighted D1 generating a sample S
      Determine optimal Feature Extraction algorithm, E, and feature count, N, using DetermineExtMethodAndCount(S, n) (cf. the definition of this function below)
      Build Filter $F_t$
         Extract features and weights using E and N over D1
         Optimize Threshold using D2
      Compute error e of $F_t$ on D1
      If e=0 or e>0.5 Terminate
      For each instance in D1:
         If instance classified correctly by model then
            Multiply weight of instance by e/(1−e)
      Normalize weights of all instances
      Set weight of model $Wgt_t$ to −log(e/(1−e))
      Store the resulting filter $F_t$ in Models[t] and weight Here e, the error associated with each component filter, could be based on any of a number of information measures such as precision, recall, fallout or remainder, F-beta, a specific utility function, and many other measures on accuracy or performance known to practitioners of the art.

DetermineExtMethodAndCount(Train, n)
1. Split Train into n subsets
2. Repeat steps 3 to 5 for all combinations {E, N} listed in _, thereby generating an average utility, Utililty$_{E,N}$, for each combination.
3. TotalFoldUtility=0
4. For f=1 to n do
   TotalUtility=0
   For i=1 to n and i f do
      Set TrainN2 to the Train less subset f and subset i.
      Build Filter F$_{f,i}$
         Do feature extraction on TrainN2 using the {E, N} extraction combination.
         Optimize the threshold for F$_{f,i}$ using subset i.
      Do a blind test using F$_{f,i}$ on subset f, thereby generating a utility value U$_{f,i}$
      UtilityArray[f][i]=U$_{f,i}$
   EndFor
5. EndFor
6. Select BestE and BestN as the combination {E, N} based upon a choice function.
7. Return BestE and BestN In this above embodiment, DetermineExtMethodAndCount, various choice functions can be used. One possible embodiment could be based upon taking the average of all utilities in the UtilityArray and selecting the combination with maximum average utility as the combination E and N to build a filter. This could be accomplished by using the operation selectExtrMethodAndCountUsingAverageUtitity(UtilityArray) as described earlier.

Alternatively, the main loop in this boosting algorithm could be executed until the error, e, reaches an asymptote around a value (possibly zero). At this point the algorithm is forced to continue for an additional t*X iterations. As has been demonstrated in the art, X is a small number, typically 0.1.

A cascade filter 592 (illustrated in FIG. 5d) is an ensemble filter that consists of an ordered list of filters {F$_1$, ..., F$_n$} 530, 535 and 540, where each filter, F$_i$ 530, 535 and 540, consists of two outputs (e.g., filter 530 has a positive output channel 555 and negative output channel 545): one corresponding to the positive class (e.g., 555, 560, 565) and the other corresponding to the negative or fallout, or remainder class (e.g., 545, 546 and 547). (A cascade filter is not limited in the number of constituent filters it can contain, though the illustration in FIG. 5d shows just three constituent filters.) Each constituent filter F$_i$ 535 and 540 is linked to the fallout, or remainder class of the filter F$_{i-1}$ via the fallout, or remainder channels 545 and 546 respectively. Each component filter 530, 535 and 540 accepts as input the source features that describe the document 515. A document 515 is processed by each filter F$_i$ in order or sequence (e.g., in left-to-right fashion starting with filter 530). Should any filter 530, 535 or 540 accept the document, processing for this document terminates and the document 515 is accepted by the ensemble filter. Otherwise, the subsequent filter F$_{i+1}$ processes the document 515 in a similar fashion. This process repeats until either some constituent filter 530, 535 or 540 has accepted the document or no filter 530, 535 or 540 has.

Figure 6:
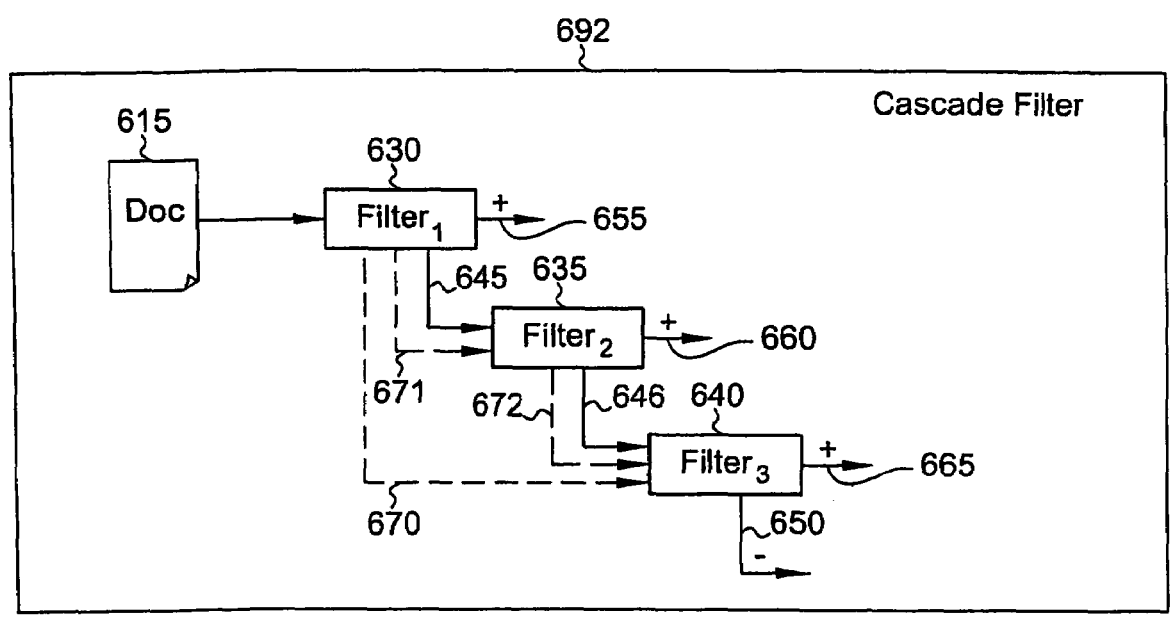
FIG. 6 is an illustration of a cascade filter using both source and derived features according to one embodiment of the present invention.
Figure 7:
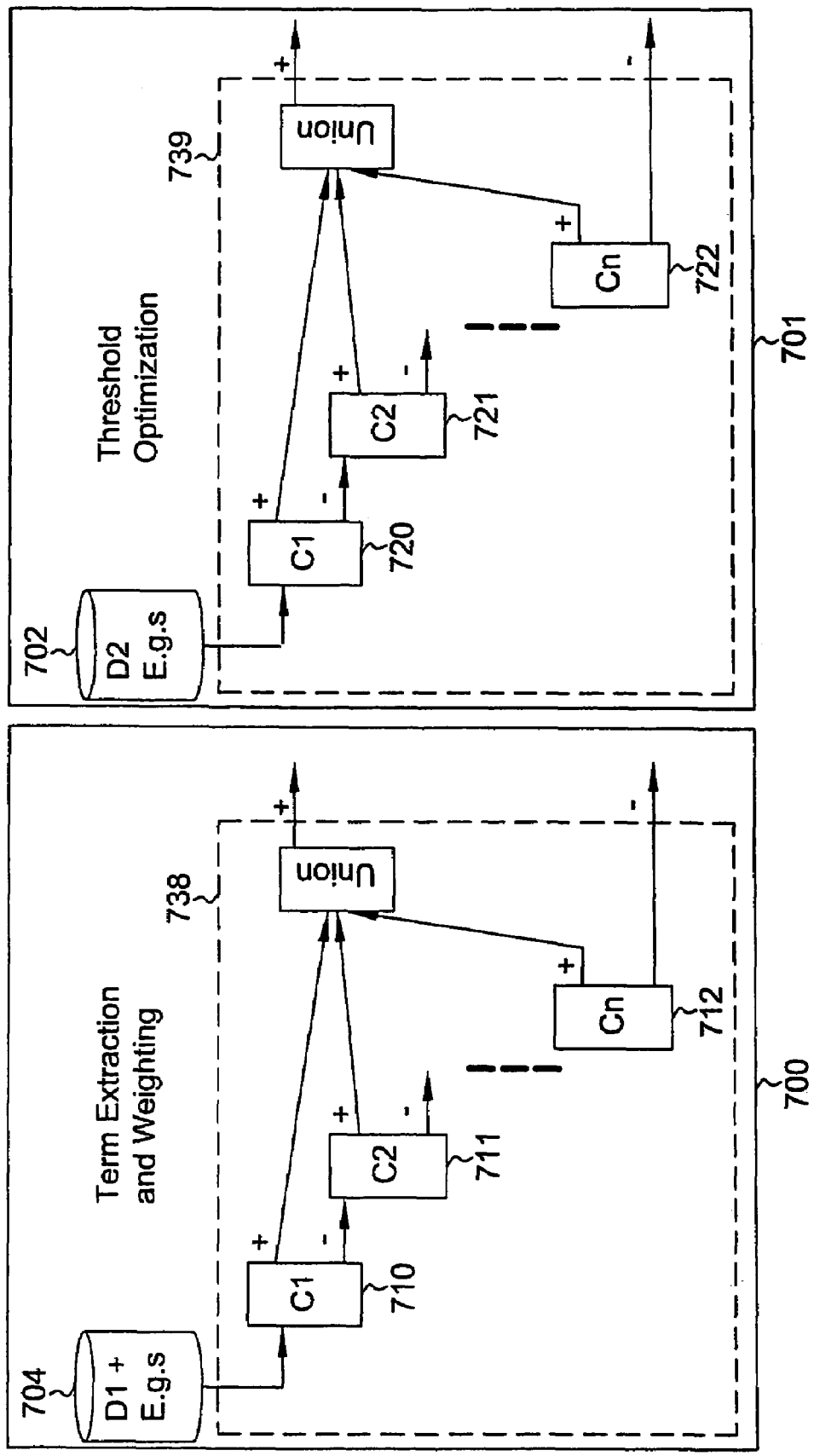
FIG. 7 is an illustration of the threads or processes used to construct a cascade filter according to one embodiment of the present invention.

A variant of a cascade filter is depicted in FIG. 6. Here, each component filter 630, 635 and 640 accepts as input the source features that describe the document 615, along with derived features from the output of earlier filters in the ensemble 670, 671 and 672. Note that elements 615, 645, 646, 650, 655, 660, 665 and 692 of FIG. 6 have functions corresponding to the functions of elements 515, 545, 546, 547, 555, 560, 565 and 592 of FIG. 5d respectively. Here the output of the previous filter could be the actual score of the document against the filter or a classification value (+1/−1) or both. Note that the information added by the processing score or other assessment by a filter ordered earlier in a sequence can be regarded as a new feature in the feature discrimination space of a subsequent filter. Such new, possibly abstract, features (such as the features 540 illustrated in FIG. 5c) can be exploited by subsequent filters in their training and in their processing of documents generally.

Figure 8:
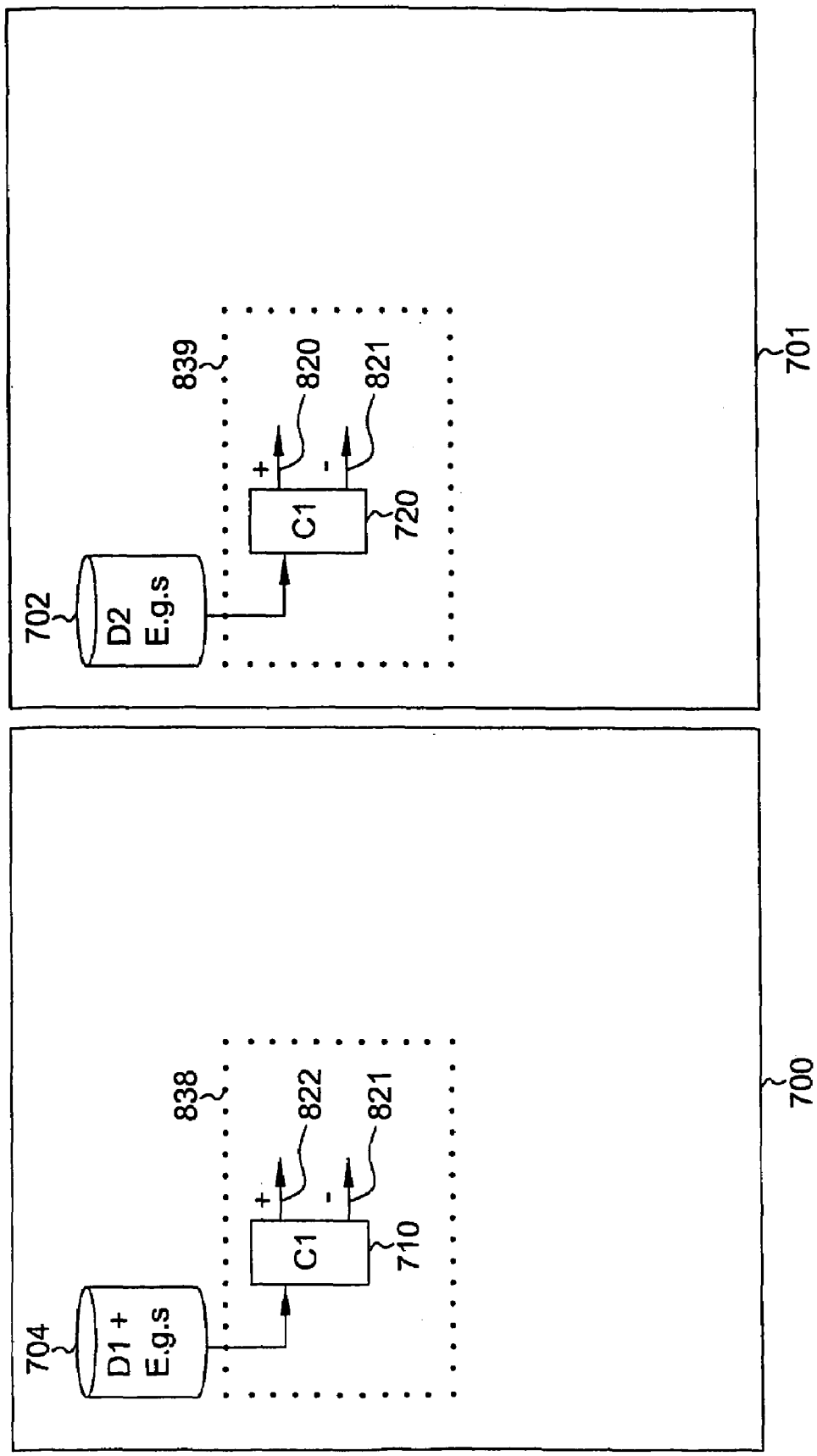
FIG. 8 is an illustration of the first steps in threads or processes used to construct a cascade filter according to one embodiment of the present invention.
Figure 9:
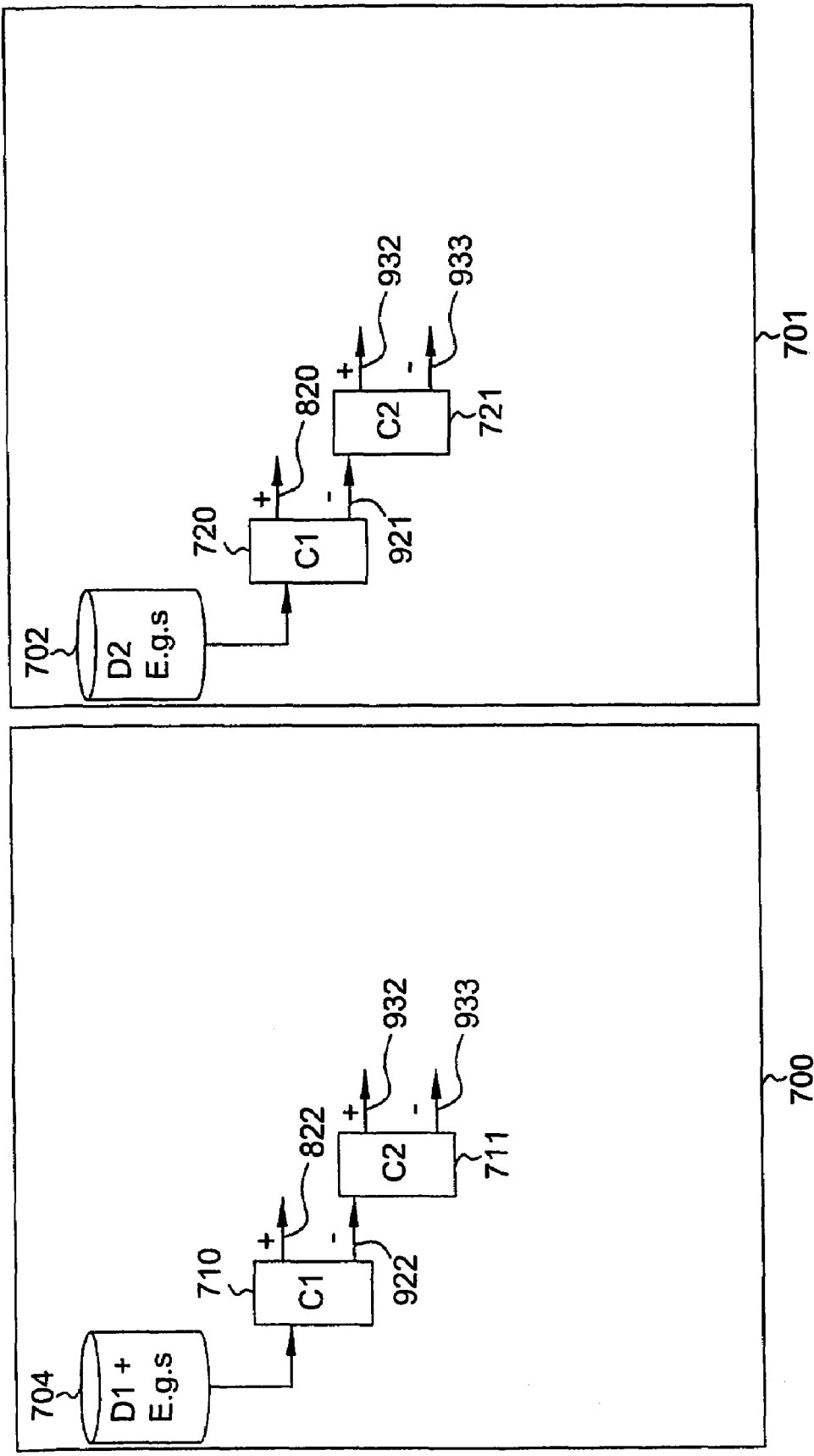
FIG. 9 is an illustration of the subsequent steps in the threads or processes used to construct a cascade filter according to one embodiment of the present invention.
Figure 10:
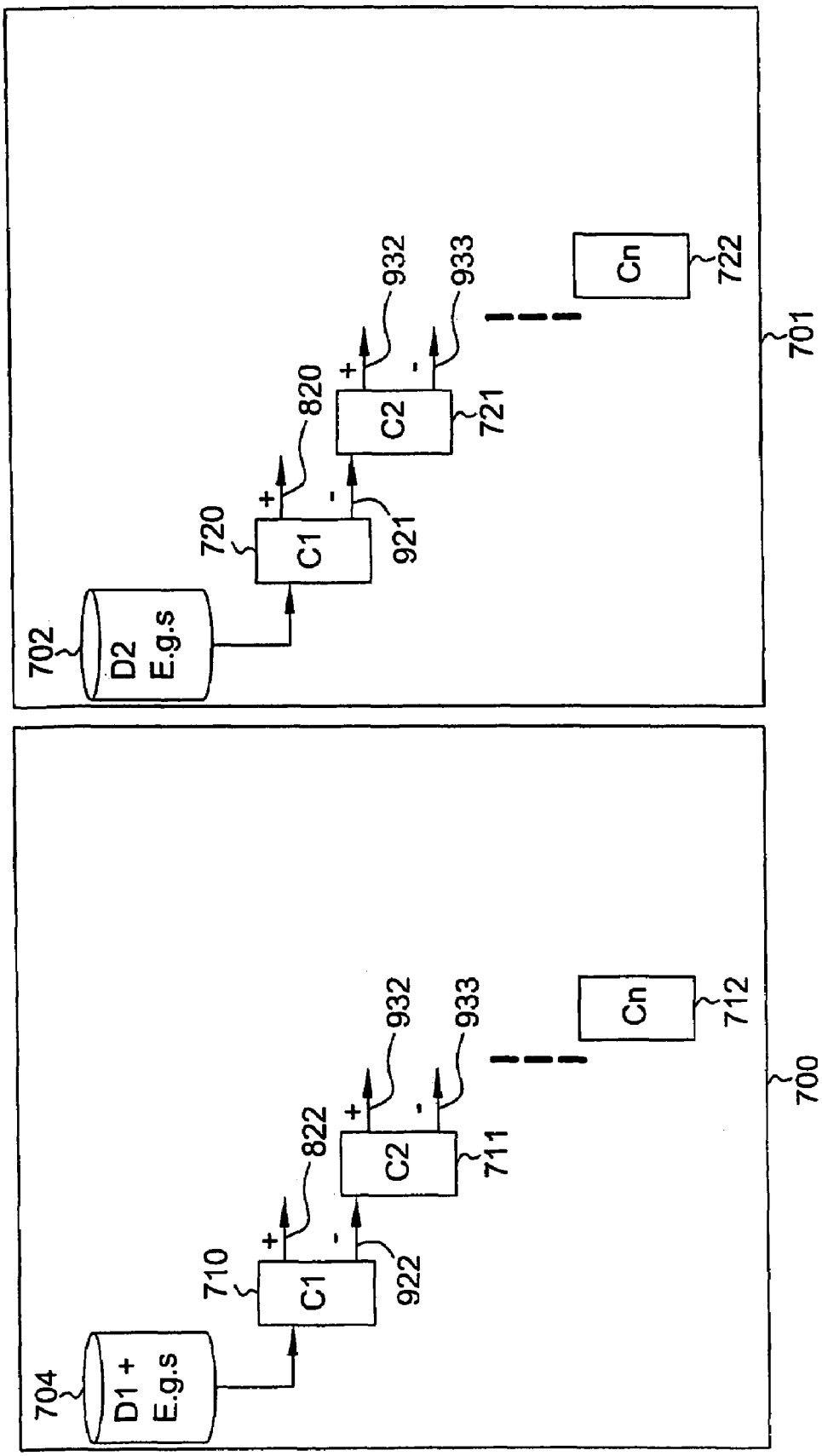
FIG. 10 is an illustration of the iterative steps in the threads or processes used to construct a cascade filter according to one embodiment of the present invention.

The focus of the construction algorithm for cascade filters is on producing a series of filters. The training set used for each filter in the series is chosen based on the performance of earlier filters in the series. A preferred embodiment for constructing a cascade filter for an information need, T, involves a number of steps and assumes as input two subsets of the training dataset D1 704, D2 702, which are respectively used for feature extraction and threshold optimization. The main steps of the algorithm are outlined in block format in FIGS. 7 to 11. The algorithm consists of two threads 700 and 701: the extraction thread 700 and the threshold-setting or threshold-optimization thread 701. Each thread results in the construction of its own cascade filter, namely, C$_{Extraction}$ 738 and C$_{Opt}$ 739. The algorithm is iterative in nature, whereby the first filter in the cascade, C1$_{Extraction}$ 710, is constructed using the positive topic examples in the extraction dataset D1 704. This cascade corresponds to the extraction cascade C$_{Extraction}$ 838. In order to set the threshold for C1$_{Extraction}$, a second cascade filter (i.e., the optimization cascade) 839 is constructed. The first constituent filter 720 in this cascade is a copy of C1$_{Extraction}$ 710 and is denoted as C1$_{Opt}$ 720. To avoid clutter in FIG. 8, the Extraction and Opt suffixes are dropped from the component filters names. The threshold 820 for C1$_{Opt}$ 720 can be set using any of a number of threshold-setting techniques with respect to a specified utility measure over the D2 dataset 702. One such method is the beta-gamma thresholding algorithm described earlier. The threshold 822 of the C1$_{Extration}$ filter 710 is set to the optimized threshold 820 of C1$_{Opt}$ 720. Subsequently, the fallout, or remainder documents from filter C1 710, which pass through the negative class channel 821 (i.e., positive examples from D1 that are rejected by C1$_{Extraction}$) are used to construct the second filter C2$_{Extraction}$ 711 in the cascade, provided various continuation conditions are met. These continuation conditions may include one or more of (but not limited to) the following: the number of documents in the fallout, or remainder of C1$_{Extraction}$, graphically depicted in FIG. 9 as 922, is greater than a minimum number of documents required to construct a filter; the utility of the C1$_{Opt}$ 720 graphically depicted in FIG. 9 as 921 over the optimization dataset is greater than some threshold (e.g., zero). Next, the threshold 932 for C2$_{Opt}$ 721 can be set using a threshold-setting techniques as described above with respect to a specified utility measure over the D2 dataset 702. The threshold of the C2$_{Extraction}$ filter 711 is set to the optimized threshold 932 of C2$_{Opt}$ 721. Subsequently, the fallout, or remainder documents from filter C2 711, which pass through the negative class channel 933 (i.e., positive examples from D1 that are rejected by C2$_{Extraction}$) are used to construct subsequent filters Cn$_{Extraction}$ 712 with scoring thresholds Cn$_{Opt}$ 722 in the cascade, provided the continuation conditions are met. The above steps of constituent filter extraction and threshold optimization (on the fallout, or remainder of each preceding filter) are repeated as long as the continuation conditions are satisfied, yielding the component filters C1, C2, ... Cn in the cascade as illustrated in FIG. 10.

Figure 11:
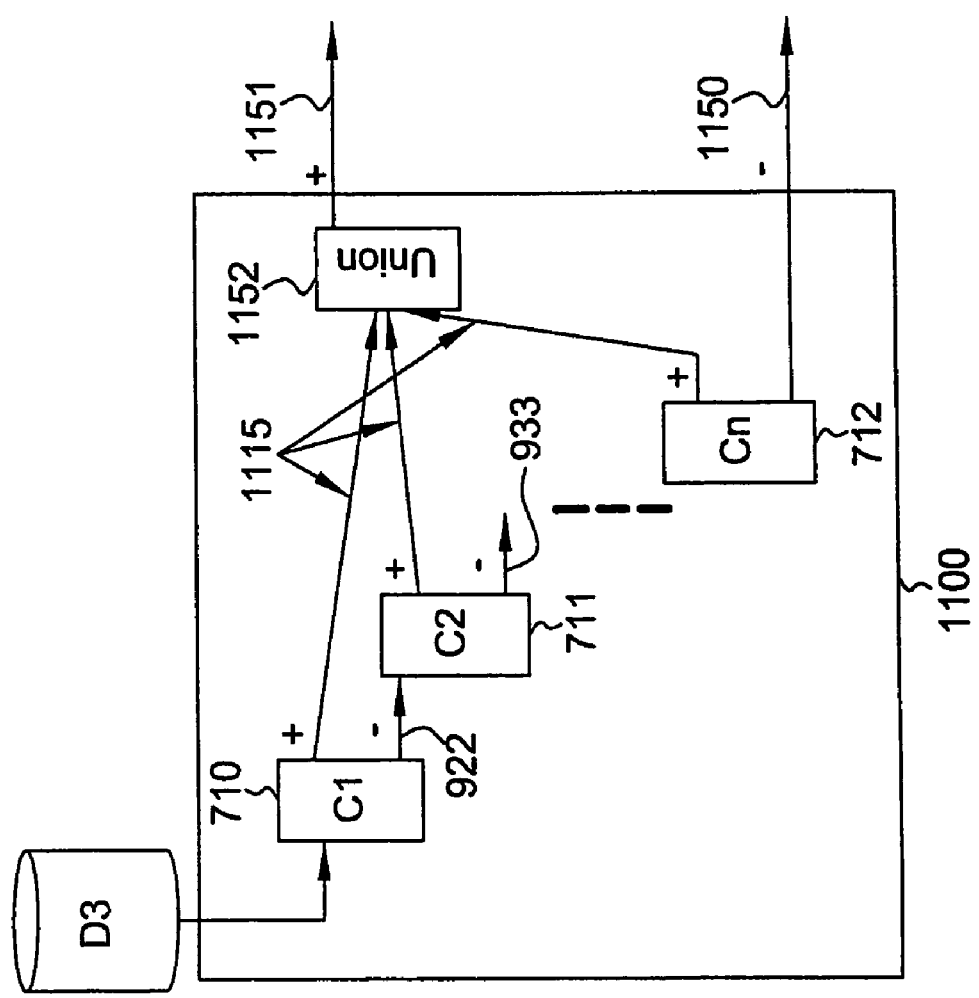
FIG. 11 is an illustration of the final step in the threads or processes used to construct a cascade filter according to one embodiment of the present invention.

Referring to FIG. 11, once any one of the continuation conditions fails, all the positive outputs of the constituent filters of the extraction cascade $C_{Extraction}$ 1115 are connected to a union filter 1152. There are two outputs of the cascade filter 1100 (corresponding to both the positive and negative results of the component filters); the output of the union filter corresponds only to the positive or accepted documents 1151; the fallout, or remainder through the final component filter corresponds to the negative or rejected documents 1150.

A variation of the above embodiment could generate a multiplex filter from the component filters 1110, 1111 (not shown) and 1112 (not shown) and arrange them in parallel as shown in FIG. 5a as 591, where the weights associated with each component filter could be utility-based.

The main steps in the above cascade construction algorithm in pseudo-code are as follows:

BuildCascade(Train, n)
    Split Train into two subsets D1 and D2
    i=1
    Partition D1 into positive examples $D1_{pos}$ and negative examples $D1_{neg}$
    While (number of documents in $D1_{pos}$>MinRequired) do
        Determine optimal Feature Extraction algorithm, E, and feature count, N, using DetermineExtMethodAndCount(D1 ∪D2) (cf. the definition of this function above)
        Build Filter F
            Extract features and weights using E and N over $D1_{pos}$
            Optimize Threshold using D2
        Models[i]=F
        Filter D1 using Models[i] into positive subset Pos[i] and negative or fallout or remainder subset Neg[i]
        Set D1 to negative subset Neg[i]
        Partition D1 into positive examples $D1_{pos}$ and negative examples $D1_{neg}$
        Filter D2 using Models[i] into positive subset Pos2[i] and negative or fallout or remainder subset Neg2[i].
        Set D2 to negative subset Neg2[i]
        If {number of positive documents in D2<minD2Required or utility on D2<minUtility } then exit while loop
    endWhile
    Arrange models in Models in cascade sequence in increasing order of index In a variation of the above D1 and D2 could be equal, that is, they would both correspond to Train.

Choosing an optimal configuration for a filter is challenging task. This can be achieved automatically using a number of approaches for selecting among alternative filter constructions or filtering techniques.

A first preferred embodiment that automates this process is outlined below. A filter construction algorithm, FilterConstructionAlg, such as monolithic, multiplex, cascade, or variants of those, is provided to this process, along with a training dataset and other parameters, such as n, the number of folds required for validation, which are required to be specified when calling this process.

EvaluateAlgorithm(FilterConstructionAlg, Train, n)
    1. Split Train into n folds or subsets
    2. TotalUtility=0
    3. For i=1 to n do
        a. Construct a filter $F_i$ using the filter construction algorithm, FilterConstructionAlg, over a subset of Train consisting of n−1 subsets, where subset i has been dropped from Train.
        b. Evaluate $F_i$ on subset i, thereby yield a utility $U_i$
        c. Utility[i]=$U_i$
    4. EndFor
    5. Return Utility vector ChooseBestModel(ConstructionAlgList, Dataset, n)
    For each learning algorithm ConstructionAlg in ConstructionAlgList do
        Utility$_{constuctionAlg}$=EvaluateAlgorithm(ConstructionAlg, Dataset, n)
    Set ConstructionAlgMax to the construction algorithm determined to be the best using a choice function
    Return ConstructionAlgMax This algorithm yields a utility value for the input filter construction algorithm. Each filter construction algorithm (and other modeling algorithms such as, but not limited to, decision trees and support vector machines) is evaluated using similar conditions (same training dataset, same value n), thereby yielding a utility measure. The best algorithm as determined by the choice function is chosen and a new filter is constructed using this algorithm with the full training dataset.

In the above embodiment, the choice function is user specified. This choice function can exploit one or more utility measures to rank the algorithms. The algorithm with the best utility will be chosen. As noted previously, utility measures can be based on aspects of the process that are not limited to information-theoretic measures. One possible embodiment of this choice function could be to select the algorithm with the highest average utility using the n-fold Utility vector calculated for each approach. Another embodiment could combine a utility-based metric (such as average n-fold utility) and a variable based upon filter complexity. One such measure of filter complexity (though not limited to) could relate to the size of the filter in terms of bytes used to store the filter. These measures could be combined using a weighted sum, whereby the weights are selected by the user. The approach with the highest combined score would be selected.

Ideally, each constructed filter should be evaluated on a significant amount of unseen data. A second preferred embodiment would exploit such a scenario. The training data is split into two subsets, whereby one subset is used to train a filter using any of the construction algorithms outlined here or other modeling strategies such as decision trees or support vector machines, etc., and the other subset, the evaluation subset, is used to evaluate the learnt models. The learnt model that performs best on the evaluation subset is chosen and can be deployed as is or retrained on the complete training dataset.

When the example documents reflect a topic that is not well focused, it may be necessary to analyze the example documents to determine their characteristics, before deciding which documents to use for profile construction and which filter construction methods and configuration to apply. One example of this problem arises when the topic has natural subcategories, as in the topic "Sports" with its many divisions into "Baseball", "Football", "Tennis", "Soccer", "Rugby", "Track and Field", etc. A set of example documents may contain many examples from one of the sub-categories (e.g., "Baseball") and only a few examples from some of the other subcategories and, therefore, as a whole set, may not offer sufficiently general features for the broader category. Another problem can arise when the example documents are divided into subsets for training. Bad divisions of the examples will lead to poor selections of features and poor settings of thresholds. As an example, consider what might occur in training for the category "Sports" if all the "Baseball" documents were included in the set that was used to extract features, all the "Tennis" documents in the mixed set used to score the partial profile and set a threshold, and all the "Rugby" documents in the mixed set used for final threshold calibration. The "Baseball" features would not serve well to select/rank "Tennis" documents, so the threshold might be unreliable or even impossible to set. And any threshold set on "Tennis" documents would be further destabilized by the final threshold calibration on "Rugby" documents. In general, in such cases it is difficult to choose subsets of example documents for optimal training, to select representative features, to set score thresholds, and to validate the performance of the profile.

A solution to this problem and a general, alternative technique for constructing multiplex filters is based upon clustering, in which documents from the dataset from which features are to be extracted for the profile are first clustered to identify subsets of documents that share feature characteristics. There are many alternative methods for document clustering known in the art, including hierarchical agglomerative clustering, k-means clustering, and others. This approach depends on the use of clustering but not on a specific clustering method.

Figure 12C:
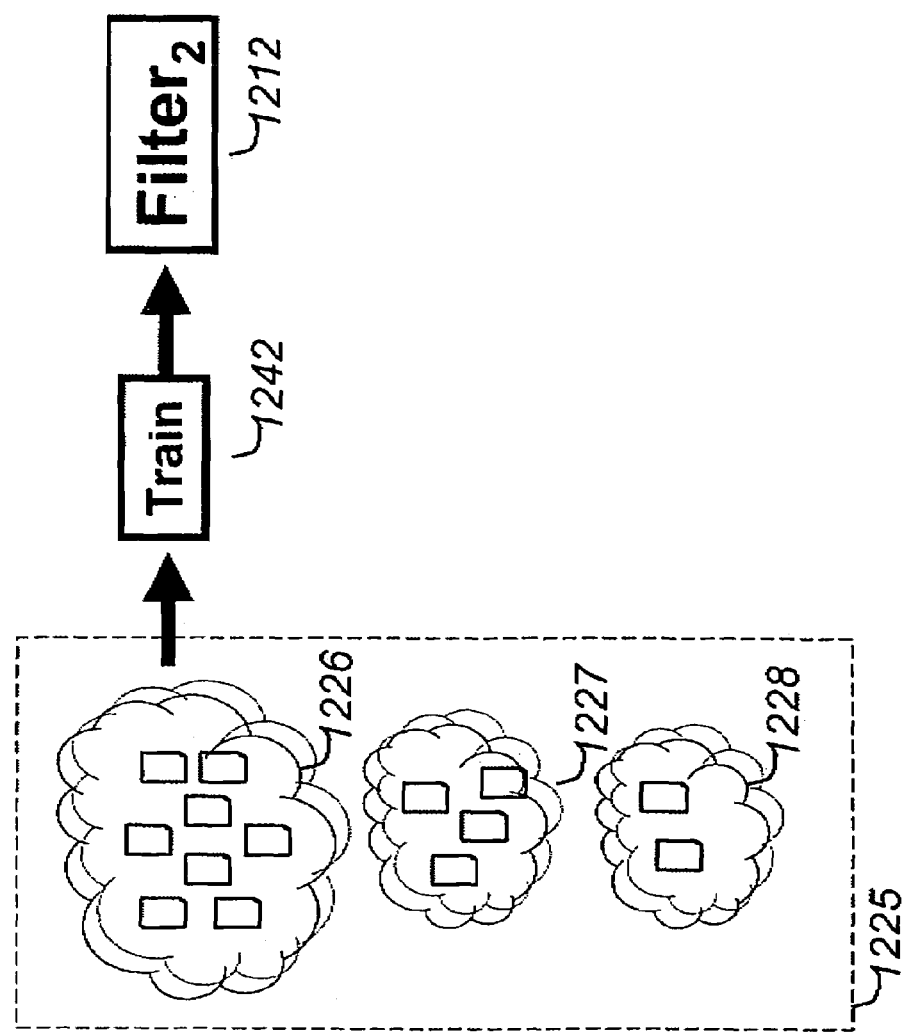
FIG. 12c is an illustration of the use of one subset in the cluster results of a fallout, or remainder set of documents used as input to create a filter according to one embodiment of the present invention.
Figure 12D:
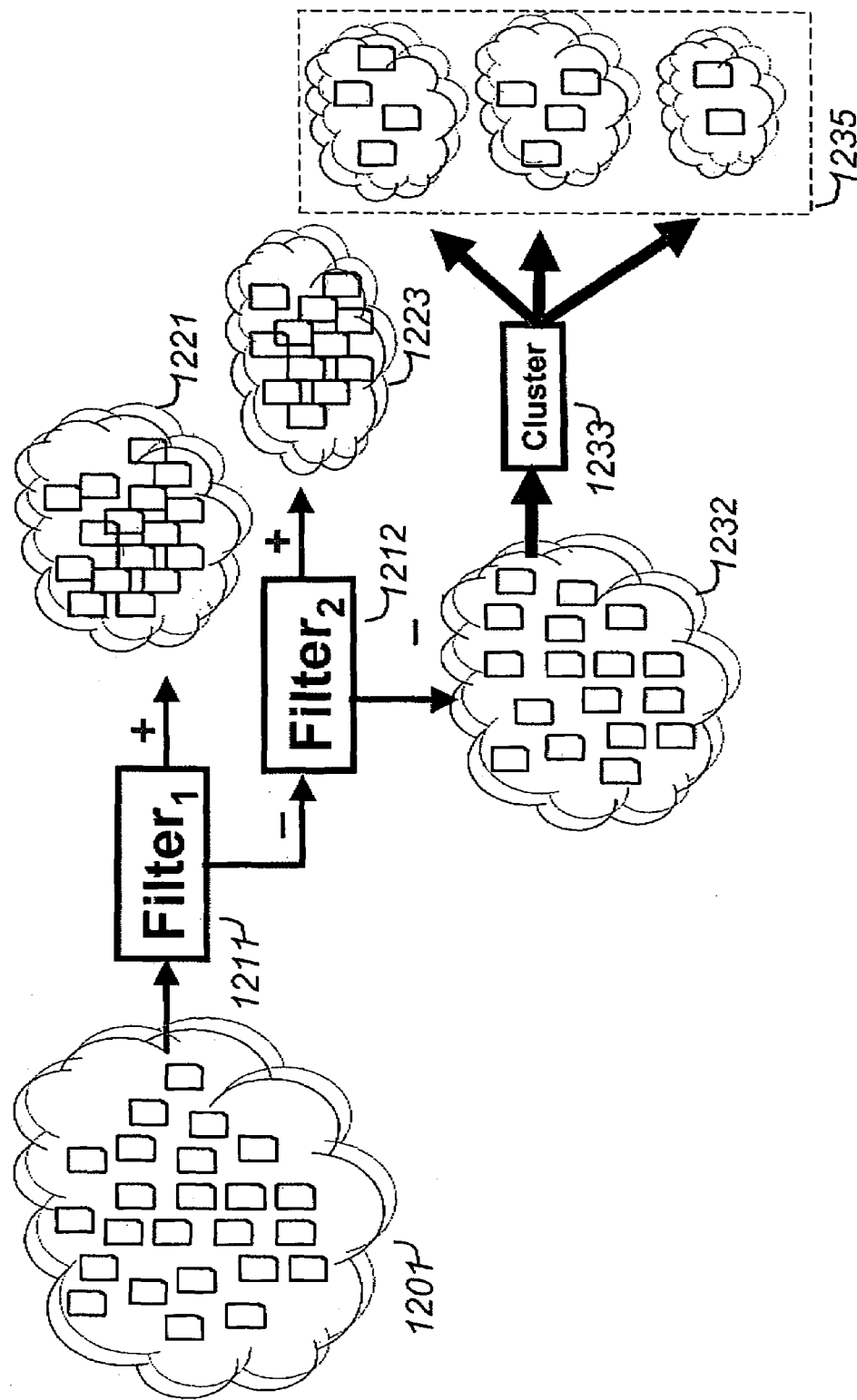
FIG. 12d is an illustration of the use of two filters in cascade order to filter documents, the fallout, or remainder subset of which is clustered to create subsets of data used in filter creation according to one embodiment of the present invention.

FIGS. 12a, 12b, 12c, and 12d illustrate one embodiment of this approach. The example (positive) documents 1201 (or a subset of the positive documents) are clustered 1231 into subsets 1205. (Though the illustration shows three subsets 1206, 1207, and 1208, the output of clustering is not limited to three subsets, but will be determined by the parameters of the clustering algorithm and the empirical characteristics of the documents and their features.) The largest subset 1206 is chosen to use for training 1210 a filter 1211. Alternatively, the "best" subset is chosen, where "best" is determined by a measure on the documents in the subset, including, but not limited to, such measures as coherence of the subset or the observed utility of a filter constructed from the subset on the source or other reference or testing data. (The methods for training this filter include all the methods of the invention.) In a preferred embodiment, as shown in FIG. 12b, this filter 1211 is used as the first filter applied to the original dataset 1201 or, alternatively, to a dataset that includes the original dataset or a subset of the original dataset. The documents 1221 accepted by the filter 1211 are set aside. (Optionally, some of these may be added to the fallout, or remainder channel.) The positive documents among the fallout, or remainder documents 1222 of filter 1211 are then clustered 1232 (with clustering method and parameter settings for clustering determined as required) to yield another set of document subsets 1225. (As before, the process is not limited to the three subsets 1226, 1227, and 1228 that are shown for illustration in FIG. 12b.) The largest of these subsets 1226 (or the "best" of these subsets) is chosen and, as further illustrated in FIG. 12c, used to train 1242 another filter 1212. As shown in FIG. 12d, the original set of documents 1201 is filtered by the first filter 1211 and the second filter 1212 arranged in a cascade. The accepted documents 1221 and 1223 of each filter 1211 and 1212 are set aside and the positive examples among the fallout, or remainder documents from the second filter 1232 are clustered 1233 (with cluster method and parameter setting as required) to yield another set 1235 of documents subsets. As before, the largest of these (or the "best") is taken as the input to another round of filter creation and the process is continued until there are no more documents in the fallout, or remainder stream left to cluster or the number left is less than the number required to create reliable clusters.

Though the illustrations in FIGS. 12a, 12b, 12c, and 12d depict a cascade approach in which all the source documents 1201 are re-filtered completely at each step to determine the fallout, or remainder that will be possibly used for clustering and to create a subsequent new filter, this is not required. The fallout, or remainder of any filter $F_{i-1}$ can be used independently as the input to a filter $F_i$ to continue the process. Each such filter can be combined in filter-creation order to form the final cascade filter.

Furthermore, it is not required that the filters created in each step be arranged in a cascade, but may be combined in all the manners of the invention.

In addition, one preferred embodiment of the invention uses the results of clustering 1205 directly to create a plurality of filters, one for each subset in the cluster output. This plurality of filters may be arranged in any manner supported by the invention.

The steps for using clustering to create filters following this and other approaches in the invention are given below.

ClusterBasedFilterConstructionMono(Train, k)
    Given Train, separate positive examples into $D1_{pos}$ and negative examples into $D1_{neg}$
    Cluster $D1_{pos}$ using a clustering algorithm (e.g., group average link agglomerative clustering)
    Select the k biggest clusters
    Construct a multiplex filter consisting of k filters using the k clusters
        For each cluster i in the set of selected k clusters
            MonolithicConstructionAlgorithm([Cluster[i] $\cup D1_{neg}$], n)

A variant of this algorithm involves, for each cluster that will be the source of a filter, the selection of the optimum filter type. In other words, for each cluster, we identify the optimum model, e.g., monolithic, multiplex, cascade, or some other type (such as a support vector machine), and use the filter constructed for that model to represent the documents in the cluster.

ClusterBasedFilterConstructionOpt(Train, k)
    Given Train, separate positive examples into $D1_{pos}$ and negative examples into $D1_{neg}$
    Cluster $D1_{pos}$ using a clustering algorithm (e.g., group average link agglomerative clustering)
    Select the k biggest clusters
    Construct a multiplex filter consisting of k filters using the k clusters
        For each cluster i in the set of selected k clusters
            ChooseBestModel(ConstuctionAlgList, [Cluster[i] $\cup D1_{neg}$], n)

A preferred embodiment using a clustering-centric cascade construction algorithm based on the above principles is outlined as follows:

Given a training dataset D1
    Partition D1 into positive examples $D1_{pos}$ and negative examples $D1_{neg}$
    i=1
    While (number of documents in $D1_{pos}$ >MinRequired) do
        Cluster positive documents in $D1_{pos}$
        Choose biggest cluster BestC (e.g., contains most documents, or most focused)
        Models[i]=MonolithicConstructionAlgorithm([Cluster[BestC]$\cup D1_{neg}$], n)
        Filter D1 using Models[i] into positive subset Pos[i] and negative or fallout or remainder subset Neg[i]
        Set D1 to negative subset Neg[i]
        Partition D1 into positive examples $D1_{pos}$ and negative examples $D1_{neg}$
    endWhile Arrange models in Models in cascade sequence in increasing order of index A more general preferred embodiment using a clustering-centric cascade construction algorithm based on the above principles is outlined as follows:

Given a training dataset D1
Partition D1 into positive examples $D1_{pos}$ and negative examples $D1_{neg}$
i=1
While (number documents in $D1_{pos}$>MinRequired) do
   Partition D1 into positive examples $D1_{pos}$ and negative examples $D1_{neg}$
   Cluster positive documents in $D1_{pos}$
   Choose biggest cluster BestC (e.g., contains most documents, or most focused)
   Models[i]=ChooseBestModel([Cluster[BestC] ∪$D1_{neg}$], n)
   Filter D1 using Models[i] into positive subset Pos[i] and negative or fallout or remainder subset Neg[i]
   Set D1 to negative subset Neg[i]
   Partition D1 into positive examples $D1_{pos}$ and negative examples $D1_{neg}$
endWhile
Arrange models in Models in cascade sequence in increasing order of index An alternative preferred embodiment based upon different stopping criteria using clustering-centric cascade construction algorithm based on the above principles is outlined as follows:

Split training dataset into two subsets D1 and D2
i=1
Partition D1 into positive examples $D1_{pos}$ and negative examples $D1_{neg}$
While (number of documents in $D1_{pos}$>MinRequired) do
   Cluster positive documents in $D1_{pos}$
   Choose best cluster BestC (e.g., contains most documents, or most focused)
   Models[i]=ChooseBestModel([Cluster[BestC] ∪$D1_{neg}$], n)
   Filter D1 using Models[i] into positive subset Pos[i] and negative or fallout or remainder subset Neg[i]
   Set D1 to negative subset Neg[i]
   Partition D1 into positive examples $D1_{pos}$ and negative examples $D1_{neg}$
   Filter D2 using Models[i] into positive subset Pos2[i] and negative or fallout or remainder subset Neg2[i].
   Set D2 negative subset Neg2[i]
   If {number of positive documents in D2<minD2Required or utility on D2<minUtility} then exit while loop
endWhile
Arrange models in Models in cascade sequence in increasing order of index In a variation of the above D1 and D2 could be equal, that is, they would both correspond to Train.

The result of filtering using ensemble filters provides a decomposition of the accepted documents that can be exploited by processes that use this output. For example, if the results are presented to a user, then this underlying structure may provide a natural means of organizing the results and aid in understanding the results. In addition the scores associated with each document and with respect to each component filter can be used to rank the documents delivered by the process.

HARDWARE OVERVIEW

Figure 13:
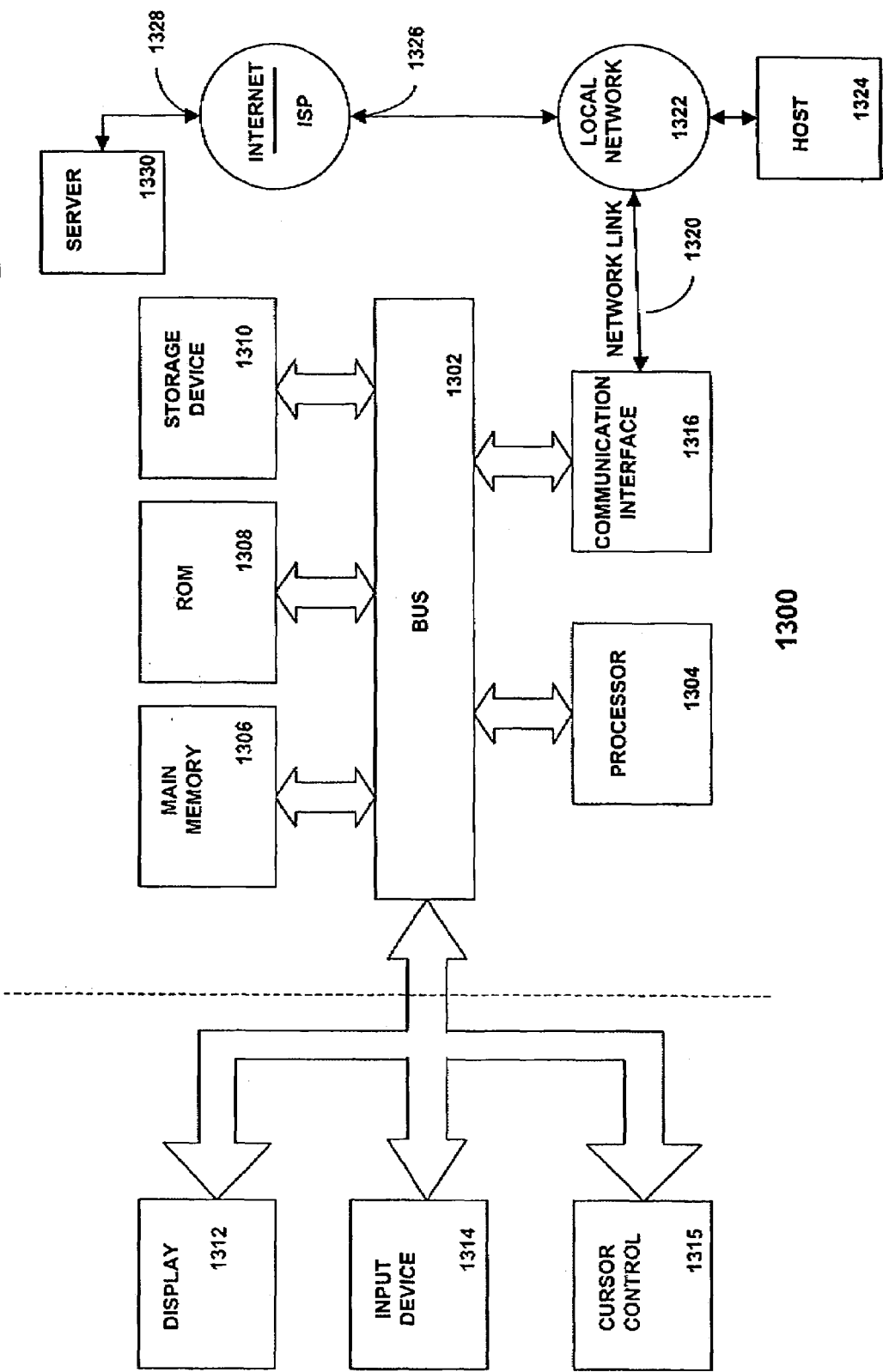
FIG. 13 is a block diagram of a computer system on which embodiments of the invention may be implemented.

FIG. 13 is a block diagram which illustrates a computer system 1300 upon which an embodiment of the invention may be implemented. Computer system 1300 includes a bus 1302 or other communication mechanism for communicating information, and a processor 1304 coupled with bus 1302 for processing information. Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1315, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), which allows the device to specify positions in a plane.

The invention is related to the use of computer system 1300 for filtering documents. The filtering process is provided by system 1300 in response to processor 1304 executing sequences of instructions contained in main memory 1306. Such instructions may be read into main memory 1306 from another computer-readable medium, such as storage device 1310. However, the computer-readable medium is not limited to devices such as storage device 1310. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read. Execution of the sequences of instructions contained in main memory 1306 causes processor 1304 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 1300 also includes a communication interface 1316 coupled to bus 1302. Communication interface 1316 provides a two-way data communication coupling to a network link 1320 that is connected to a local network 1322. For example, communication interface 1316 may be an integrated services digital network (ISDN) card or a modem to provide a data communication connection to a corresponding type of telephone line. As another example, communication interface 1316 may be a local area network (LAN) card to provide a data communication connection to a compatible LAN. Wireless links may also be implemented. In any such implementation, communication interface 1316 sends and receives electrical, electromagnetic or optical signals which carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals which carry digital data streams. The signals through the various networks and the signals on network link 1320 and through communication interface 1316, which carry the digital data to and from computer system 1300, are exemplary forms of carrier waves transporting the information.

Computer system 1300 can send messages and receive data, including program code, through the network(s), network link 1320 and communication interface 1316. In the Internet 1328 for example, a server 1330 might transmit a requested code for an application program through Internet 1328, ISP 1326, local network 1322 and communication interface 1316. In accordance with the invention, one such downloaded application provides for the retrieval or filtering of information using chunks of text as described herein. Program code received over a network may be executed by processor 1304 as it is received, and/or stored in storage device 1310, or other non-volatile storage for later execution. In this manner, computer system 1300 may obtain application code in the form of a carrier wave.

Components of the invention may be stored in memory or on disks in a plurality of locations in whole or in part and may be accessed synchronously or asynchronously by an application and, if in constituent form, reconstituted in memory to provide the information required for retrieval or filtering of documents.

While this invention has been particularly described and illustrated with reference to particular embodiments thereof, it will be understood by those skilled in the art that changes in the above description or illustrations may be made with respect to form or detail without departing from the spirit or scope of the invention.

We claim:

1. A process for creating an ensemble filter for selecting documents, comprising:
   identifying a first set of documents from a training set of documents;
   identifying a first profile corresponding to said first set of documents;
   identifying a second set of documents and a third set of documents from said training set of documents;
   identifying a fourth set of documents from said third set of documents;
   identifying a second profile corresponding to said fourth set of documents;
   creating a first filter based upon said first profile;
   creating a second filter based upon said second profile; and
   combining said first filter with said second filter to create an ensemble filter; and
   storing said ensemble filter in a computer readable medium, said ensemble filter being accessible by computer readable program code for filtering documents.

2. A process, as in claim 1, further comprising: clustering said training set of documents to identify said first set of documents.

3. A process, as in claim 1, further comprising:
   clustering said training set of documents and selecting said largest cluster to identify said first set of documents.

4. A process, as in claim 1, further comprising:
   cascading said first filter with said second filter to create at least part of said ensemble filter.

5. A process, as in claim 1, further comprising:
   multiplexing said first filter with said second filter to create at least part of said ensemble filter.

6. A process, as in claim 2, further comprising:
   cascading said first filter with said second filter to create at least part of said ensemble filter.

7. A process, as in claim 3, further comprising:
   cascading said first filter with said second filter to create at least part of said ensemble filter.

8. A process, as in claim 2, further comprising:
   multiplexing said first filter with said second filter to create at least part of said ensemble filter.

9. A process, as in claim 3, further comprising:
   multiplexing said first filter with said second filter to create at least part of said ensemble filter.

10. A process for selecting documents from a stream of documents, comprising:
    identifying a first set of documents from a training set of documents;
    identifying a first profile corresponding to said first set of documents;
    identifying a second set of documents and a third set of documents from said training set of documents;
    identifying a fourth set of documents from said third set of documents;
    identifying a second profile corresponding to said fourth set of documents;
    creating a first filter based upon said first profile;
    creating a second filter based upon said second profile; and
    combining said first filter with said second filter to create an ensemble filter; and
    passing said stream of documents through said ensemble filter.

11. A process, as in claim 10, further comprising: clustering said training set of documents to identify said first set of documents.

12. A process, as in claim 10, further comprising: clustering said training set of documents and selecting said largest cluster to identify said first set of documents.

13. A process, as in claim 10, further comprising:
    cascading said first filter with said second filter to create at least part of said ensemble filter.

14. A process, as in claim 10, further comprising:
    multiplexing said first filter with said second filter to create at least part of said ensemble filter.

15. A process, as in claim 11, further comprising:
    cascading said first filter with said second filter to create at least part of said ensemble filter.

16. A process, as in claim 12, further comprising:
    cascading said first filter with said second filter to create at least part of said ensemble filter.

17. A process, as in claim 11, further comprising:
    multiplexing said first filter with said second filter to create at least part of said ensemble filter.

18. A process, as in claim 12, further comprising:
    multiplexing said first filter with said second filter to create at least part of said ensemble filter.

19. A process for selecting documents from a database of documents, comprising:
    identifying a first set of documents from a training set of documents;

identifying a first profile corresponding to said first set of documents;

identifying a second set of documents and a third set of documents from said training set of documents;

identifying a fourth set of documents from said third set of documents;

identifying a second profile corresponding to said fourth set of documents;

creating a first filter based upon said first profile;

creating a second filter based upon said second profile; and combining said first filter with said second filter to create an ensemble filter; and applying said ensemble filter to said database to select documents.

20. A process, as in claim 19, further comprising: clustering said training set of documents to identify said first set of documents.

21. A process, as in claim 19, further comprising:

clustering said training set of documents and selecting said largest cluster to identify said first set of documents.

22. A process, as in claim 19, further comprising:

cascading said first filter with said second filter to create at least part of said ensemble filter.

23. A process, as in claim 19, further comprising:

multiplexing said first filter with said second filter to create at least part of said ensemble filter.

24. A process, as in claim 20, further comprising:

cascading said first filter with said second filter to create at least part of said ensemble filter.

25. A process, as in claim 21, further comprising:

cascading said first filter with said second filter to create at least part of said ensemble filter.

26. A process, as in claim 20, further comprising:

multiplexing said first filter with said second filter to create at least part of said ensemble filter.

27. A process, as in claim 21, further comprising:

multiplexing said first filter with said second filter to create at least part of said ensemble filter.

28. An apparatus for generating an ensemble filter, comprising:

a processing system; and a memory coupled to the processing system, wherein the processor is configured to:

identify a first set of documents from a training set of documents;

identify a first profile corresponding to said first set of documents;

identify a second set of documents and a third set of documents from said training set of documents;

identify a fourth set of documents from said third set of documents;

identify a second profile corresponding to said fourth set of documents;

create a first filter based upon said first profile;

create a second filter based upon said second profile; and combine said first filter with said second filter to create an ensemble filter;

store said ensemble filter in a computer readable medium, said ensemble filter being accessible by computer readable program code for filtering documents.

29. An article of manufacture comprising a computer readable medium having executable program code embodied therein for generating an ensemble filter, wherein the executable program code is adapted to cause the processing system to:

identify a first set of documents from a training set of documents;

identify a first profile corresponding to said first set of documents;

identify a second set of documents and a third set of documents from said training set of documents;

identify a fourth set of documents from said third set of documents;

identify a second profile corresponding to said fourth set of documents;

create a first filter based upon said first profile;

create a second filter based upon said second profile; and combine said first filter with said second filter to create an ensemble filter;

store said ensemble filter in a computer readable medium, said ensemble filter being accessible by computer readable program code for filtering documents.

* * * * *